United States Patent
Yacoub et al.

(10) Patent No.: US 8,826,169 B1
(45) Date of Patent: Sep. 2, 2014

(54) HIDING CONTENT OF A DIGITAL CONTENT ITEM

(75) Inventors: Sherif M. Yacoub, Seattle, WA (US); Xi Long, Bellevue, WA (US); Ming Zhao, Bellevue, WA (US); Xuping Zhang, Seattle, WA (US); Manikandan Gopalakrishnan, Tamil Nadu (IN)

(73) Assignee: Amazon Technologies, Inc., Reno, NV (US)

( * ) Notice: Subject to any disclaimer, the term of this patent is extended or adjusted under 35 U.S.C. 154(b) by 137 days.

(21) Appl. No.: 13/488,071

(22) Filed: Jun. 4, 2012

(51) Int. Cl.
*G06F 17/21* (2006.01)
*G06F 3/00* (2006.01)
*G06F 3/0488* (2013.01)
*G06F 17/30* (2006.01)

(52) U.S. Cl.
CPC ........ *G06F 3/0488* (2013.01); *G06F 17/30867* (2013.01)
USPC ............ 715/776; 715/202; 715/730; 715/704

(58) Field of Classification Search
CPC ............ G06F 3/0488; G06F 17/30867; G06F 17/30997
USPC .................................. 715/776, 202, 730, 704
See application file for complete search history.

(56) References Cited

U.S. PATENT DOCUMENTS

| | | | | |
|---|---|---|---|---|
| 7,996,436 B2 * | 8/2011 | Schneider et al. | ............ | 707/802 |
| 8,024,672 B1 * | 9/2011 | Skwarecki et al. | ............ | 715/854 |
| 8,065,603 B2 * | 11/2011 | Gossweiler, III et al. | ..... | 715/227 |
| 8,117,553 B2 * | 2/2012 | Danninger et al. | ............ | 715/764 |
| 8,225,208 B2 * | 7/2012 | Sprang et al. | ................ | 715/730 |
| 8,261,177 B2 * | 9/2012 | Krishnaswamy et al. | ..... | 715/202 |
| 8,327,260 B2 * | 12/2012 | Bays et al. | .................... | 715/230 |
| 8,499,243 B2 * | 7/2013 | Yuki | ............................ | 715/735 |
| 8,533,623 B2 * | 9/2013 | St. Jacques, Jr. | .............. | 715/776 |
| 8,539,379 B2 * | 9/2013 | Skwarecki et al. | ........... | 715/854 |
| 8,560,971 B2 * | 10/2013 | Duquene et al. | .............. | 715/853 |
| 8,564,544 B2 * | 10/2013 | Jobs et al. | ...................... | 345/173 |
| 8,635,544 B2 * | 1/2014 | Kim et al. | ...................... | 715/764 |
| 2013/0031503 A1 * | 1/2013 | Madhavan et al. | ............ | 715/776 |

* cited by examiner

*Primary Examiner* — David Phantana Angkool
(74) *Attorney, Agent, or Firm* — Lee & Hayes, PLLC

(57) ABSTRACT

In some implementations, content of a content item may be presented on an electronic device and a portion of the content item may be selected to be hidden from presentation. The electronic device may hide the selected portion of the content during presentation of the content. Further, selection information identifying at least the location of the selected portion of the content item may be communicated over a network to a computing device to enable synchronization of the hidden content with other instances of the content item on other devices of the user. In some examples, the user may select one or more chapters of the content item to be hidden by selecting one or more chapter identifiers in a table of contents of the content item. Hidden content may include text, images, audio and/or video content, depending on the type of content item that is accessed.

33 Claims, 17 Drawing Sheets

US 8,826,169 B1

HIDING CONTENT OF A DIGITAL CONTENT ITEM

BACKGROUND

The continued proliferation of digital content items has led to an increase in the availability of such digital content, as well as an increase in the availability of electronic devices and applications used for consuming these content items. For instance, users consume content items, such as electronic books (eBooks), digital videos, digital songs, digital images, and the like, on an assortment of electronic devices. As the number of content items and devices for consuming content items continues to increase, users are ever more interested in enhancing their experiences while consuming these digital works.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Hiding Content

Figure 1:
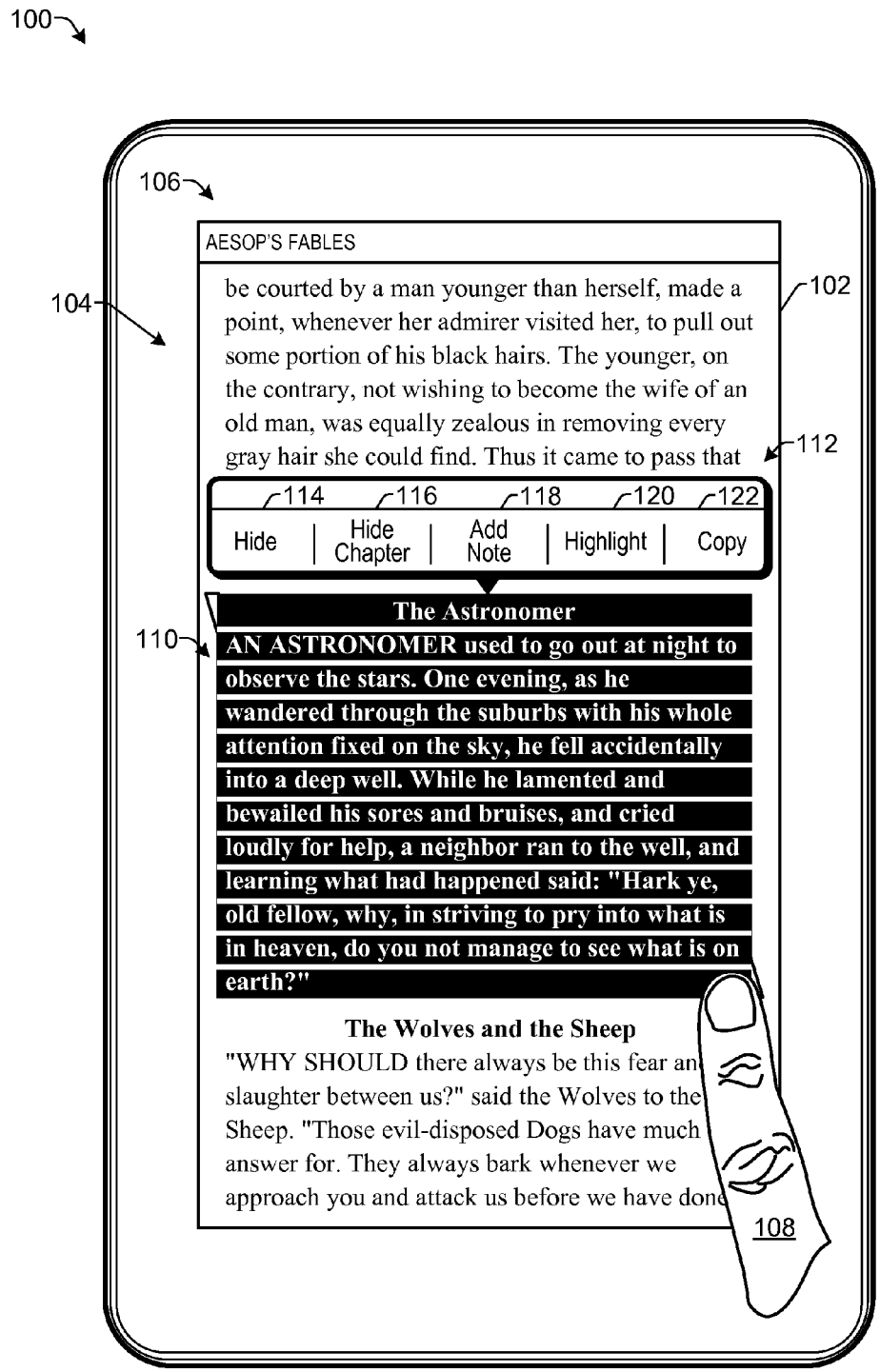
FIG. 1 illustrates an example of selecting a portion of a content item to be hidden according to some implementations.

This disclosure includes techniques and arrangements for collapsing and/or hiding content of a digital content item. For instance, an electronic device may present content of a content item, such as on a display associated with the electronic device. In some examples, a user of the electronic device may choose to hide a portion of the content. As one example, the user may select a portion of content to be hidden or otherwise not displayed with the remainder of the content of the content item. Upon selection of the portion of content, an interface may be presented to the user to enable the user to elect to hide the selected content. As another example, the interface may additionally, or alternatively, enable the user to elect to collapse and hide an entire chapter or section of the content item in which the selected content is included. As still another example, the user may select a chapter identifier in a table of contents or other identifier of a content portion for hiding the corresponding content portion. Thus, by selecting an identifier of content to hide, rather than the content itself, considerable time may be saved.

In some cases, if the user has multiple devices associated with the content item, hidden content information may be automatically provided to the user's other devices so that when the user access another copy or another instance of the content item on a different device, the portion of content that was hidden on using the first device is also hidden on the instance of the content item on the different device. For example, when the user hides a portion of a content item presented on a first device, hidden content information may be sent to a content provider computing device. The content provider computing device may then synchronize the hidden content information with other devices of the user that include a copy of the content item.

In some implementations, an icon, notification, or other indicator may be displayed in the location at which the portion of the content is hidden. For example, if one or more lines of text are collapsed or otherwise hidden, the indicator may indicate how many lines of text are hidden. Similarly, if one or more chapters of a content item are hidden, the indicator may identify the one or more chapters that are hidden at the location in the content item. Further, in some examples, the indicator may include a selectable control or button to enable a user to expand or unhide the hidden portion of content.

Additionally, in some cases, the user may not be able to unhide certain portions of content, such as in the case in which the content was hidden by another user, the content provider, the publisher, or the like. For instance, the hidden content might only be permitted to be unhidden after the occurrence of an event, the arrival of a specified date or time, passage of a specified amount of time, and so forth. Alternatively, the hidden content may be unhidden after the other user or content provider, etc., unlocks the hidden content. As an example, a teacher may send an instruction to the content provider to unhide content on student devices, such as answers to problems in a textbook, following completion of a corresponding assignment by the students in the teacher's class.

In addition, in some cases an author, publisher or content provider may identify content to be hidden in a content item to provide compatibility with devices of different types having different content presentation capabilities. For example, a first type of device may be able to display a portion of content in a first format, while a second type of device may be able to display the content using a second format. Accordingly, the content item may include both formats of content, with the content in the second format to be hidden by the first type of the device, and the content in the first format to be hidden by the second type of device.

For discussion purposes, some example implementations are described in the environment of collapsing and hiding content such as text or images in connection with an eBook or other content item. However, the implementations herein are not limited to the particular examples provided, and may be extended to other types of content items and other types of content configurations, as will be apparent to those of skill in the art in light of the disclosure herein.

Example Interfaces

FIG. 1 illustrates an example electronic device 100 to present a user interface to enable hiding a portion of content of a content item according to some implementations. The electronic device 100 may be implemented as any of a number of different types of electronic devices, as discussed further below. In some examples, the electronic device 100 may include a display 102 to present an interface 104 for displaying, rendering, or playing a content item 106. Further, in some types of electronic devices 100, the display 102 may be a touch-sensitive display configured with a sensor to sense a touch input received from an input effecter, such as a finger of a user, a stylus, or the like. Thus, the touch-sensitive display may receive one or more touch inputs, stylus inputs, selections of text, and so forth.

In other implementations, the display 102 may be non-touch sensitive. Accordingly, in addition to, or as an alternative to, a touch sensitive display, the electronic device 100 may include various external controls and input devices. For example, some implementations (not shown in FIG. 1) of the electronic device 100 may include a virtual or physical keyboard, a mouse, a pointing stick, a touchpad, a trackball, a joystick, a remote control, buttons and/or various other controls for performing various desired inputs and interactions with the electronic device 100 and the content item 106 presented on the display 102. Additionally, in some implementations, one or more voice commands may be used to control or interact with the content items or interfaces herein. Further, in some examples, a user's eye position or point of focus may be detected to serve as inputs or commands. Thus, implementations herein are not limited to any type of input devices, techniques, or controls.

In some cases, the content item 106 may be an electronic book (eBook) having one or more pages of text. For example, the display 102 may present the text of the eBook and any illustrations, tables, maps, or graphic elements that might be contained in the eBook. The terms "book" and/or "eBook," as used herein, broadly include electronic or digital representations of printed works, as well as digital content that may include text, multimedia, hypertext, and/or hypermedia. Examples of digital content items include, but are not limited to, electronic versions of books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, and so forth, as well as personal documents of a user, such as emails, business documents, financial documents, and numerous other types of documents that the user may view or interact with using the electronic device. Accordingly, the terms "book" and/or "eBook" may include any readable or viewable textual content that is in electronic or digital form. Additionally, implementations herein are not limited to eBooks or digital text, but may also include other types of content items, such as digital audio (e.g., music, songs, audible books, etc.), digital video (e.g., movies, television, short clips, etc.), images (e.g., art, photographs, etc.), and other multi-media content.

In the illustrated example of FIG. 1, suppose that the content item 106 that the user is currently consuming is an eBook version of *Aesop's Fables* and that the user has encountered a portion of the content item 106 that the user would like to hide The user may collapse or otherwise hide the portion such that the portion is no longer visible to the user during the current session and will not be presented with the rest of the content when the user accesses the content item 106 again in the future. In this example, the user may select the portion of content that the user desires to hide such as by using an input object or device. For instance, in the case that the display 102 is a touch screen, the user may use a finger 108 to select a desired portion 110 of the content item 106. Alternatively, the user may use a different type of input device such as a mouse, joystick, or any other suitable input device for selecting the portion 110 of the content item 106, depending, at least in part, on a type of the electronic device 100 and a type of the content item 106.

Upon selecting the portion 110, the electronic device 100 may present the user with an interface 112 that includes a selectable "hide" option or "hide" button 114, which the user may select to hide the selected portion 110 of the content item 106. For example, the user may use finger 108 to select the hide button 114 to collapse or otherwise hide the selected portion 110. Furthermore, the interface 112 may include other features that may be selected instead of the hide button 114. For instance, the interface 112 may include a "hide chapter" button or control 116 that may be selected by the user to hide the entire chapter, or an entire section of a content item, rather than merely the selected content. For example, suppose that the user has read a portion of a chapter and decides to hide the entire chapter. Thus, the interface 112 may provide the hide chapter control 116 to enable the user to hide the entire chapter, rather than having to first select the entire content of the chapter to hide the chapter, or return to the table of contents to hide the chapter.

Additionally, in the illustrated example, the interface 112 includes a note button 118 that may be used to add an annotation at the location of the selected portion 110; a highlight button 120 that may be used to highlight the selected portion 110; and a copy button 122 that may be used to copy the selected content portion 110; however in other examples, these additional features may be excluded from the interface 112. As still another alternative, the electronic device 100 may automatically hide the selected portion 110 upon receiving the selection by the user, without presenting the interface 112. Other variations will also be apparent to those of skill in the art in light of the disclosure herein.

Furthermore, in the case that the content item is a video, such as a movie, TV show, etc., the user may select a portion of the video to be hidden using a suitable control such as a scrubbing interface that enables the user to controllably select a particular portion of the video. Similarly, in the case that the content item is a song or other audio recording, the user may select a portion of the audio recording to be hidden during future playbacks of the audio recording.

Figure 2:
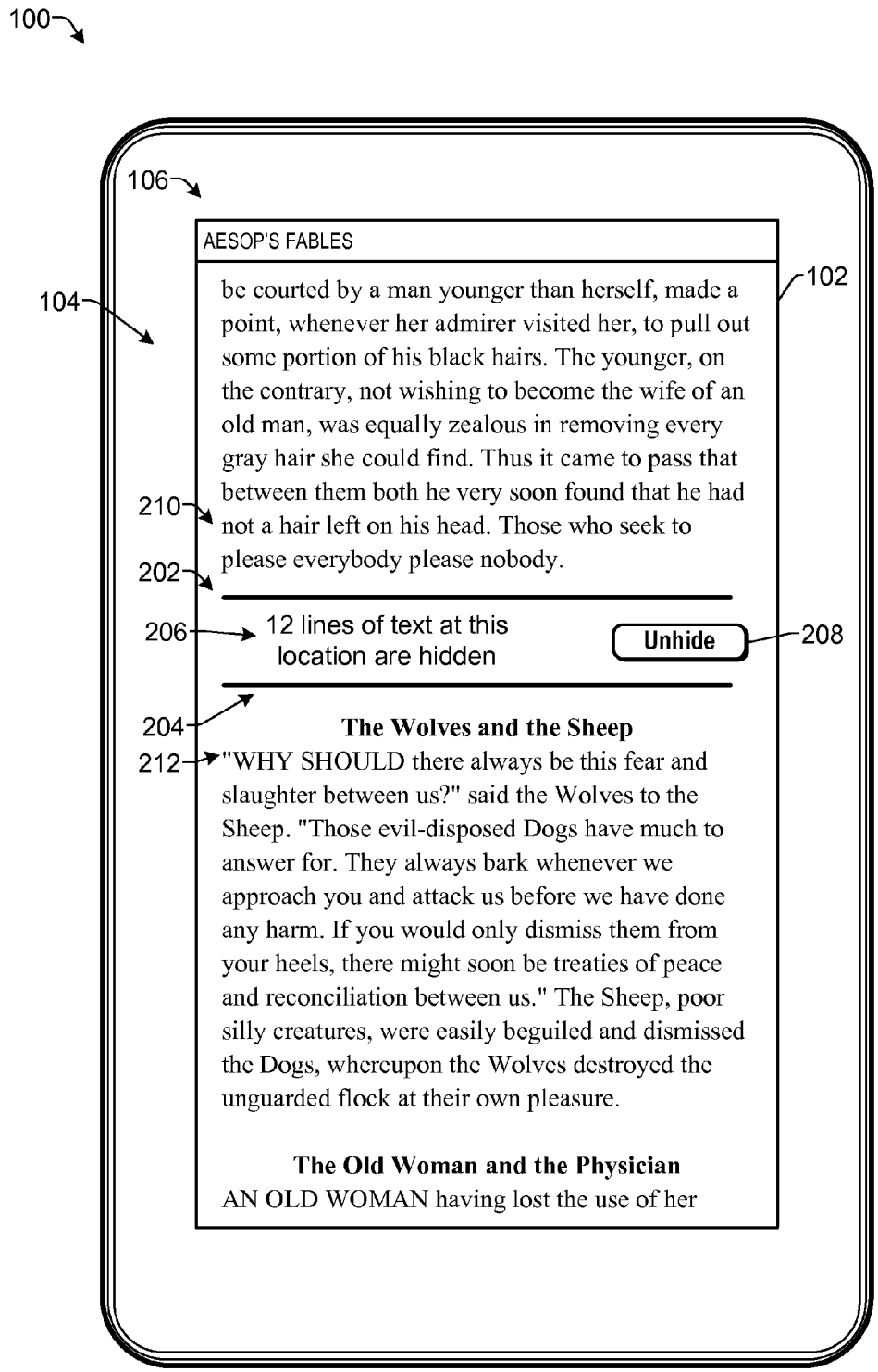
FIG. 2 illustrates an example of a content item with a portion of the content hidden according to some implementations.

FIG. 2 illustrates an example of the digital content item 106 of FIG. 1 in which the selected portion 110 has been hidden at location 202 in response to the input received from the user. In this example, an indicator 204 is provided at the location 202 in the content item 106 at which the selected portion 110 of content has been hidden. The indicator 204 may include a description 206 or other information regarding how many lines of text from this location 202 are currently hidden. As another example, the indicator 204 may include a portion of the hidden content, such as the first three or four words of the hidden content, to provide an indication of the subject matter of the hidden content.

Furthermore, the indicator 204 may include a selectable control or "unhide" button 208 that may be selected by the user to unhide the portion of content currently hidden at the location 202 in the content item 106. Numerous different types of indicators 204 and controls 208 may be used and, thus, implementations herein are not limited to any particular type of indicator, number, icon, marking, color-coding, or the like, for indicating that content has been hidden at a location in a content item 106. For example, in some cases, the control 208 itself may serve as the indicator 204. Further, various types of controls 208 may include arrows, plus/minus signs, various other types of icons, symbols, graphics, and so forth. As one example, a right-pointing arrow may be displayed as the control 208, and may be selected by the user to unhide the hidden content. The unhidden content may be presented along with a left-pointing arrow or other graphic as a control that may be selected to re-hide the unhidden content. For example, the control for re-hiding the content may be displayed permanently or temporarily adjacent to the unhidden content to enable the user to easily re-hide the unhidden content without having to reselect the content. As one example, the control for re-hiding the content may fade partially or completely after the elapse of a period of time. Thus, implementations herein are not limited to any particular configuration for the indicator 204 and/or control 208. Alternatively, in some implementations, the indicator 204 may not be used, and the content item 106 may smoothly transition from content 210, before the location 202, to content 212, after the location 202, with no detectable break or indicator 204 at the location 202 of the hidden content. Other variations will be apparent to those of skill in the art having the benefit of the disclosure herein.

Figure 3:
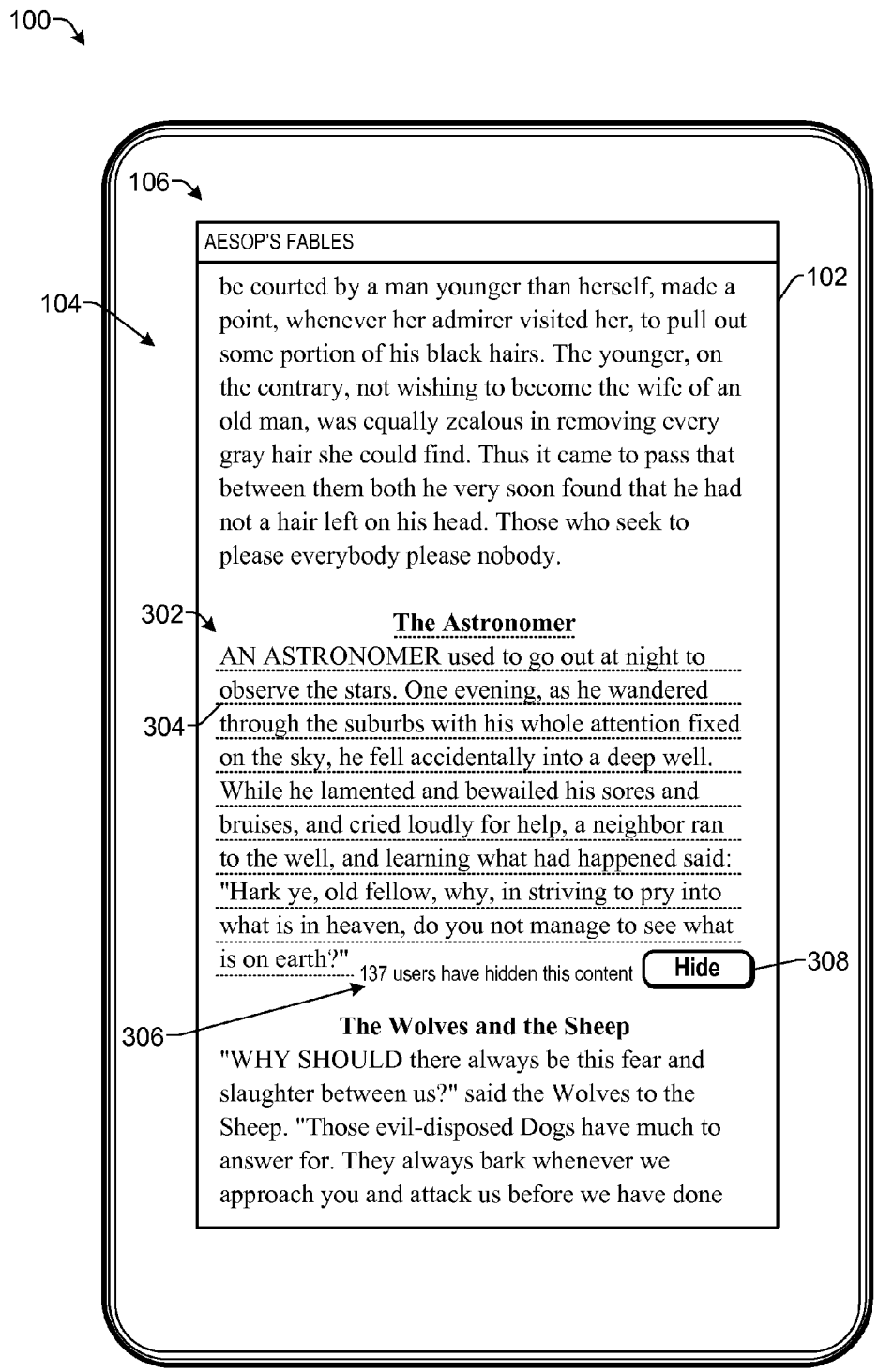
FIG. 3 illustrates an example of a content item including an indication of a portion of the content item that has been hidden by other users according to some implementations.

FIG. 3 illustrates an example in which a portion of content that has been deleted by one or more other users is identified in the currently presented content item 106 according to some implementations. In this example, a portion 302 of the content item 106 is identified during display of the content item 106 as having been hidden in the past by one or more other users of one or more other devices 100. For example, suppose that a plurality of users of a plurality of devices 100 decide to hide the portion 302 of content item 106. As discussed below, this hidden content information may be communicated to, and aggregated by, a content provider that also provided the content item 106 to the current user device 100. Accordingly, one or more portions 302 of the content item 106 that are popularly or frequently hidden by other users (i.e., "popular collapses" or "popular hides") may be identified to a current user such as by underlining 304 and/or by a message 306, or by any other suitable indicator, such as highlighting, color coding, bolding, italicizing, or the like. Furthermore, a selectable control or "hide" button 308 may be displayed adjacent to the portion 302 to enable the user to conveniently and quickly hide the particular portion 302 using a single step of selecting the hide button 308. For example, the user may tap the hide button 308 to automatically hide the identified portion 302 of the content item 106, rather than having to manually select the identified portion 302 of the content.

Figure 4:
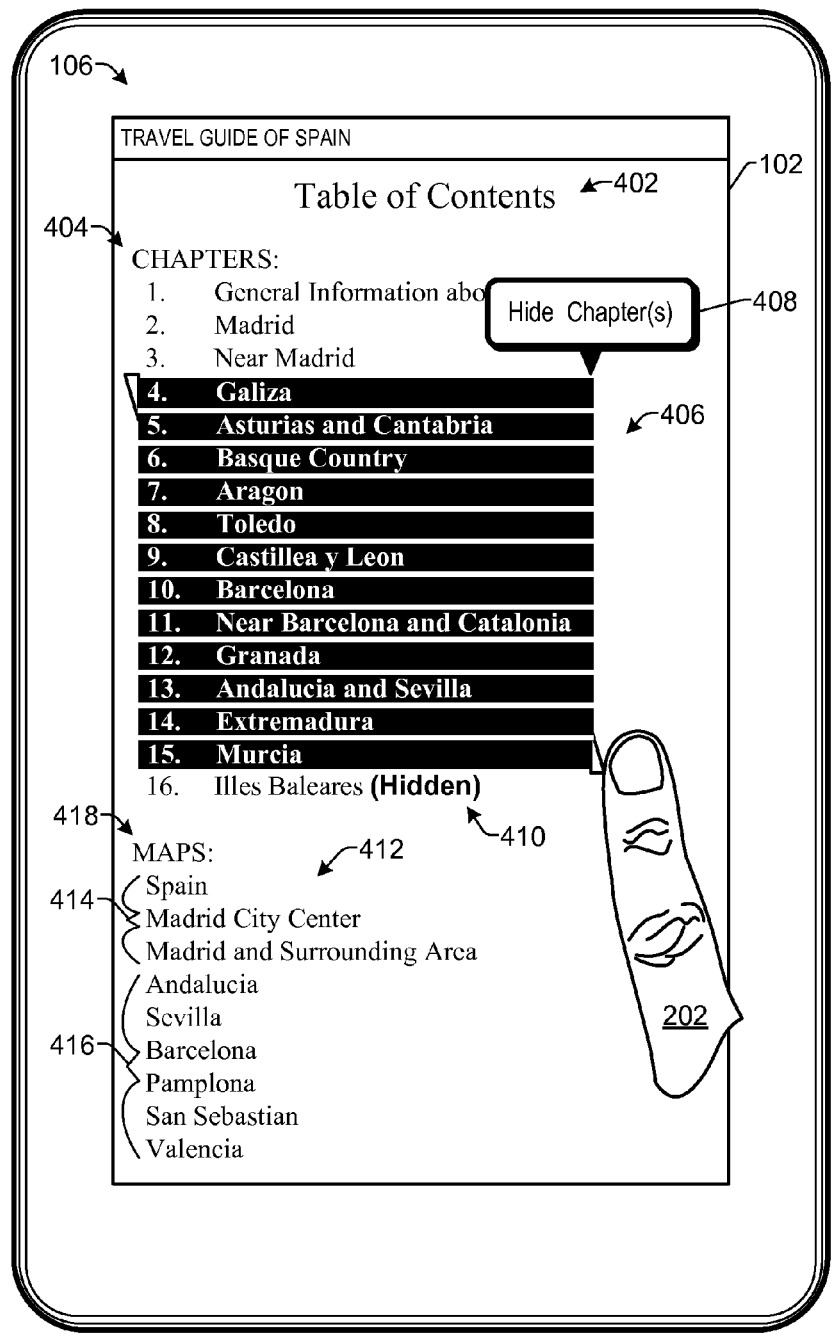
FIG. 4 illustrates an example of selecting chapters to be hidden in a content item according to some implementations.

FIG. 4 illustrates another example of a technique for collapsing or otherwise hiding a portion of a content item 106. In this example, suppose that the content item 106 is a travel guide of Spain and that the user is only planning to travel to Madrid while traveling in Spain. Accordingly, the user may access the table of contents 402 of the content item 106, and may highlight or otherwise select one or more chapters 404 that the user desires to hide in the content item 106. Thus, as illustrated in FIG. 4, at 406, the user may elect to hide chapters 4-16, which are not related to Madrid. For example, suppose that the user has already selected and hidden chapter 16, and has now selected the identifiers for chapters 4-15. Upon making the selection 406, the device 100 may present the user an interface or selectable button 408 that enables the user to hide portions of the content item 106 corresponding to the selected chapters 4-15. Consequently, in this example, rather than having to select the actual portion of the content to be hidden, the user may select an identifier of the content portion, e.g., a chapter name or chapter identifier in this example, and selection of the identifier of the portion of content results in the corresponding portion of content being hidden when the user accesses the location of that portion of content in the content item 106. Further, in the table of contents 402, the chapter identifiers themselves may not be hidden. Rather, the chapter identifiers may remain visible, and an annotation, icon, or other indicator 410 may be added next to each chapter identifier indicating that the corresponding chapter of the content item is currently hidden, as indicated adjacent to the chapter identifier for chapter 16. Additionally, or alternatively, the indicator 410 may include changing the appearance of the chapter identifiers, such as changed color, fading, italicizing, underlining, bolding, etc. Thus, a user may quickly scan the table of contents 402 to determine which chapters of the content item 106 are currently hidden. Additionally, while the interface 408 is shown in this example, other suitable interfaces, such as the interface 112 discussed above with respect to FIG. 1, may alternatively be employed.

Furthermore, the content item 106 in the example of FIG. 4 includes a listing of maps 412 provided in the content item 106. Thus, in a manner similar to that described above, the user may keep visible a subset 414 of the maps 412 related to Madrid and Spain in general, while hiding one or more other maps 416 that are not related to areas to which the user is traveling. Accordingly, in implementations herein, the user is able to hide a plurality of maps or other images by selecting an identifier of the map or image to specify that the corresponding map or image be hidden when the content item 106 is presented on the device 100. Alternatively, of course, the user might select each map or other image individually at its actual location in the content item 106, and specify that the particular map or image be hidden, but such a technique may be more time consuming. As another example, the user might select just the single representative identifier "maps" 418 to hide all of the maps in the content item. Furthermore, certain types of content items 106, such a children's books, may include a similar single representative identifier 418 that enables user to hide or unhide all of the pictures or images in the content item. Further, in some examples, an index, glossary, or other listing representative of different portions of content of a content item may be accessed for selecting portions of content to hide by selecting representative identifiers, rather than having to select the content itself. Other representative identifiers that may be selected for hiding particular types of content portions will be apparent to those of skill in the art in view of the disclosure herein.

Figure 5:
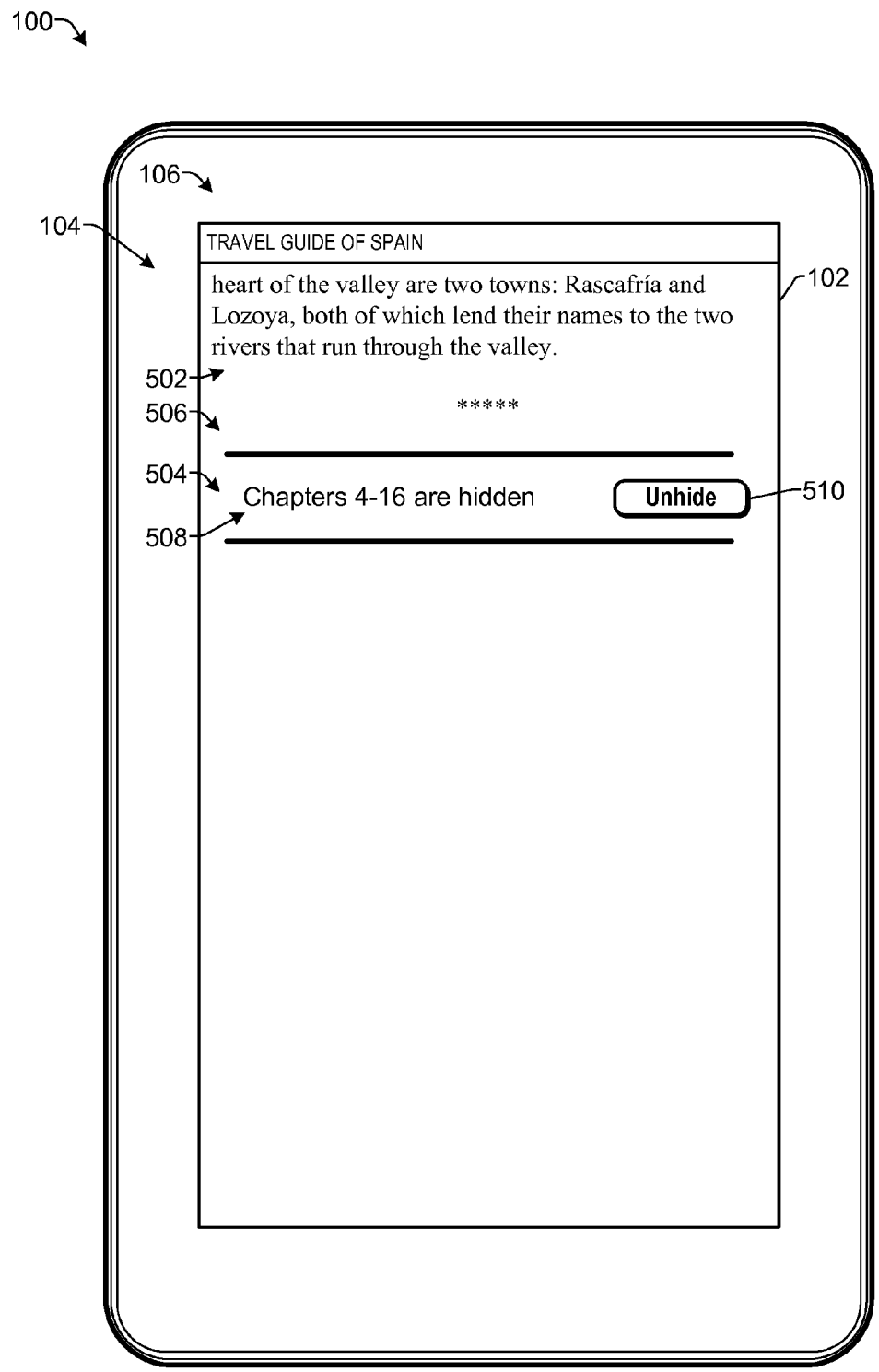
FIG. 5 illustrates an example of a content item having chapters that are hidden according to some implementations.

FIG. 5 illustrates an example of the content item 106 of FIG. 4, following hiding of the chapters 4-16 according to some implementations. For example, suppose that the user advances through the content item 106 to the end 502 of the third chapter. An indicator 504 may be provided at a location 506 in the content item 106 indicating that a portion of the content item is hidden at the location 506. In this example, the indicator 504 includes an indication 508 such as an icon, message, number, or other description of the hidden content. For example, the indication 508 may indicate that one or more chapters located at location 506 are currently hidden. Furthermore, the indicator 504 may include a selectable control or "unhide" button 510 that may be tapped on or otherwise selected by the user to unhide some or all of the hidden content. For instance, in the case that multiple chapters are hidden, if the user taps the unhide button 510, the user may be presented with the option to select particular chapters to unhide.

Thus, some examples herein allow a user to select or otherwise specify particular portions of a content item 106 to be hidden when the user accesses the content item 106. The hidden content may be persisted in the content item 106, such that each time the user accesses the content item 106, the portion(s) of hidden content will remain hidden. Furthermore, as discussed below, the information regarding the hidden content may be automatically synchronized to other copies of the content item 106 that the user may maintain on other electronic devices 100. For instance, a plurality of electronic devices 100 may be associated with a particular user account and the content thereon may be synchronized among plurality of devices. Therefore, when the user accesses another copy of the content item 106 maintained on a different electronic device 100, the content previously hidden in a first copy of the content item on a first electronic device 100 may also be hidden in a second copy of the content item accessed on a second electronic device 100, different from the first electronic device 100.

Furthermore, in some examples, different users may share an electronic device and/or a library of content items. Thus, a first user may hide a portion of content in a particular content item 106 maintained on a particular electronic device 100. A second user may log on to the particular electronic device 100 using a different user name from the first user and may access the particular content item 106. In some implementations, the portion of content hidden by the first user is not hidden to the second user when the second user accesses the particular content item.

Alternatively, in other examples, such as in the case of a teacher-student or parent-child relationship, the content may remain hidden. For example, a parent may choose to hide certain content in a particular content item 106. When the child accesses the particular content item 106, on the same electronic device 100, or on a different electronic device 100, the content may remain hidden and, furthermore, the child may be prevented from unhiding the hidden content. As another example, students taking a class from an instructor may be provided with a digital textbook that includes hidden content that the students may not be able to access. For example, the textbook may include problems and answers to the problems, but the answers may be hidden from the students until a particular event has occurred such as the arrival of a predetermined point in time, or an action taken by the instructor to unhide the hidden answers. As yet another example, portions of the textbook that are not relevant to the current class being taken by the students may be hidden in advance by the instructor, by the content provider, or by the publisher, and may be a unhidden when the students enroll in a subsequent class, pay a subsequent fee to access the hidden content, or the like.

As another example, suppose that a content item, such as a textbook, includes a definition for a term, but that the user finds the definition too technical or complex to be of use. The user may select the definition and hide the definition, while leaving the term itself visible. The user may then insert an annotation into the content item at the location of the hidden portion of content to provide for the term a definition that the user is better able to understand. For example, the user's instructor may have provided the user with a clearer definition, or the user may have worked out a clearer definition by himself or herself. Thus, the user may effectively edit the content item 106 to include portions of content that improve the user's experience while hiding portions of content that detract from the user's experience.

Figure 6:
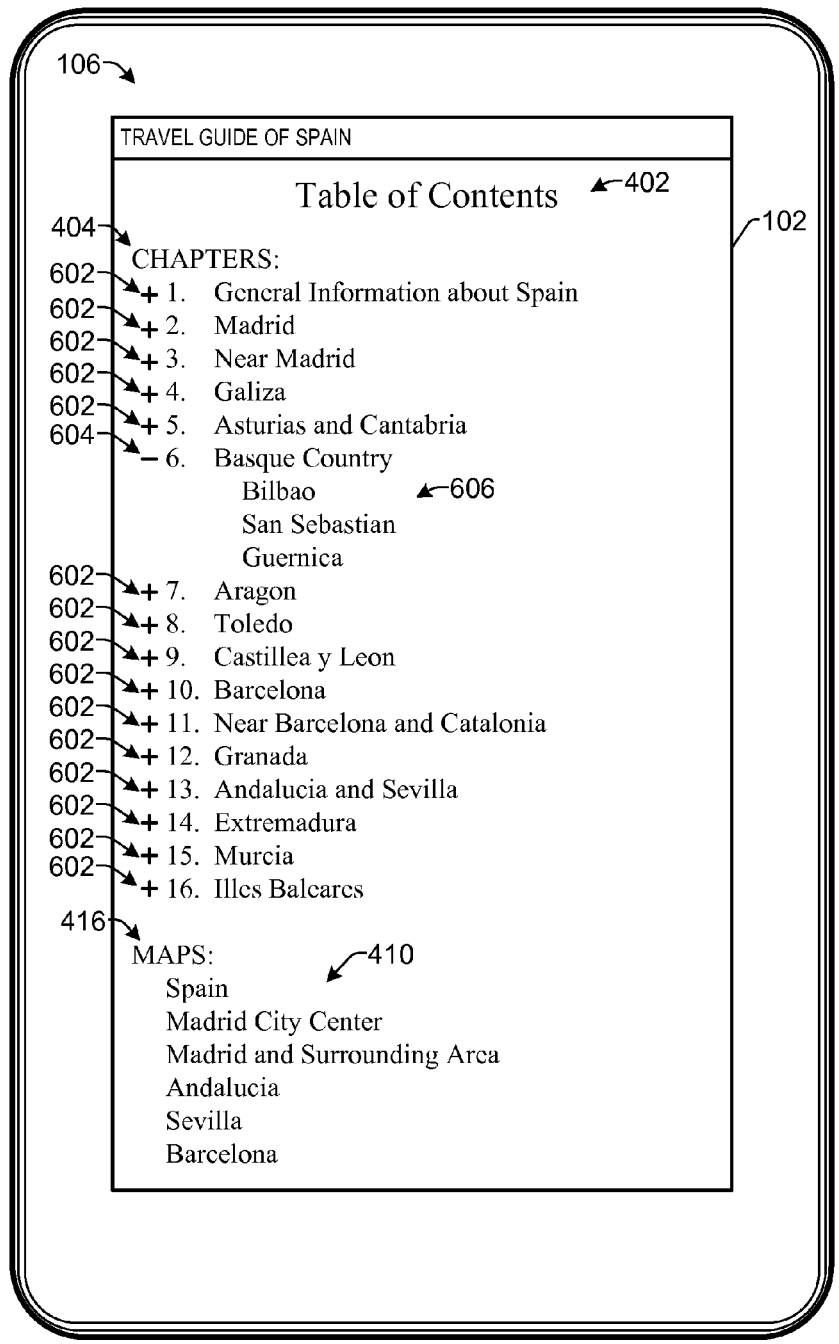
FIG. 6 illustrates an example of a content item having content that is collapsed or hidden prior to delivery to a user and which may be expanded or unhidden by the user according to some implementations.

FIG. 6 illustrates an example in which one or more portions of content may be hidden by a provider of the content item, such as by an author, publisher, or a content item provider. In this example, an indicator 602 is located adjacent to a location of hidden content that may be unhidden by the user. For instance, the indicator 602 may be a "+" sign that may be selected by the user to unhide the hidden content. In the example of FIG. 6, suppose that the user has selected an indicator to unhide content associated with the identifier for Chapter 6, i.e., "Basque Country." The selection may result in another indicator 604, such as a "−" sign, being displayed adjacent to the location at which the hidden content is unhidden. Accordingly, the unhidden content 606 in this example includes a plurality of subheadings of the Chapter 6, namely, "Bilbao," "San Sebastian," and "Guernica." The user may tap the "−" sign to again hide the unhidden content 606, which will result in a "+" sign being displayed adjacent to the identifier for Chapter 6.

Numerous other types of content portions may be hidden in advance by an author, publisher, or provider of the content item 106. For example, in the case in which a content item 106 includes adult material, the adult material may be automatically hidden in the case that a user account is associated with a person who is too young to access the adult material. Further, as mentioned above, in the case of a digital textbook for a particular class, certain chapters of the textbook may be hidden for students, for example, enrolled in an undergraduate class and then unhidden when the students are enrolled in a graduate level class.

As another example, a user may be able to set preferences so that certain portions of a content item are automatically hidden upon receipt of a content item. For instance, the user may specify that the front cover, copyright and publisher information pages, title page, and/or table of contents might be hidden automatically when a user accesses a new eBook, so that the first page presented to the user is the first page of actual text or content. Various other use cases will be apparent to those of skill in the art in light of the disclosure herein.

Example Architectures

Figure 7:
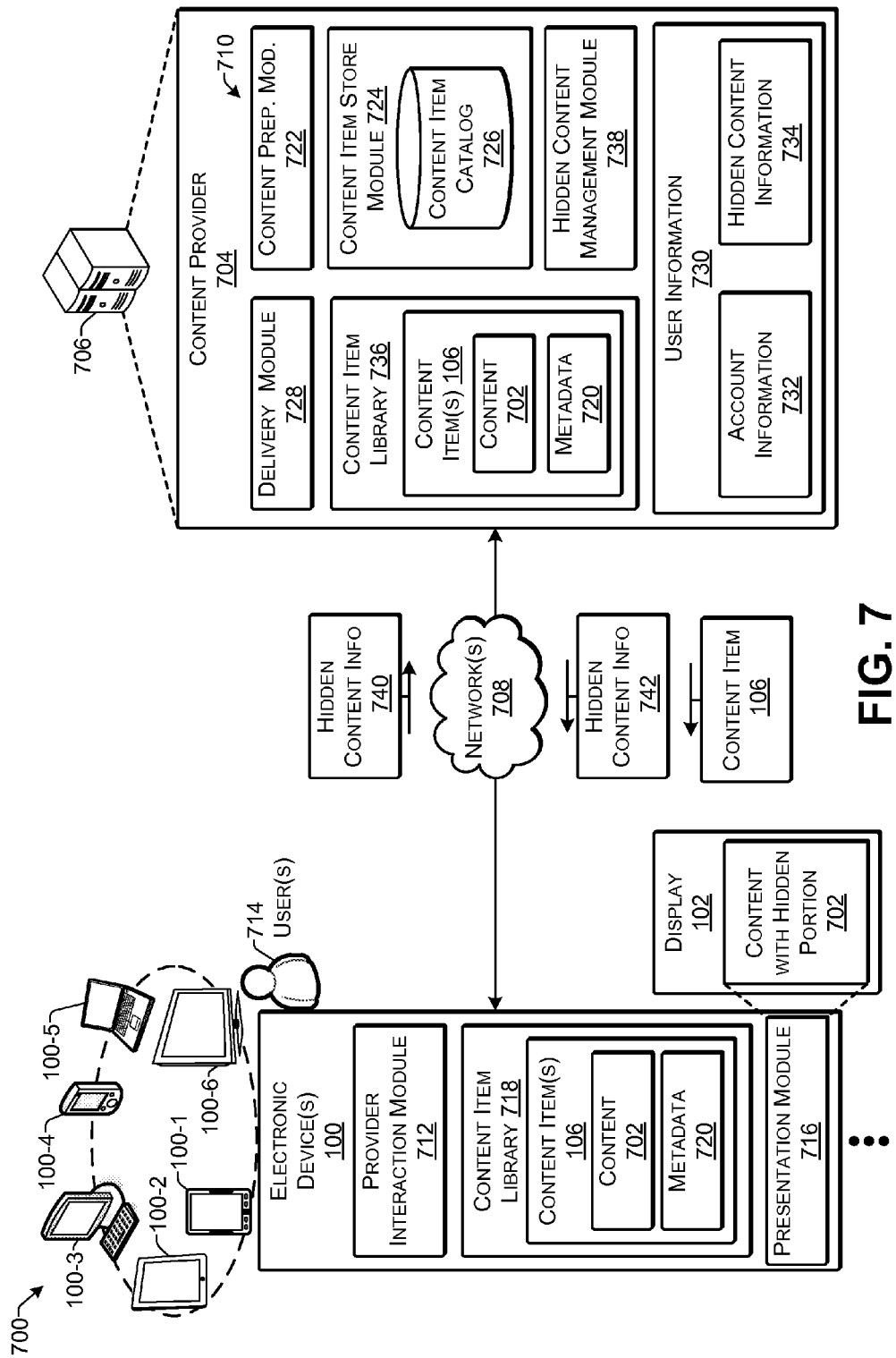
FIG. 7 illustrates an example system architecture for providing a content item and communicating hidden content information according to some implementations.

FIG. 7 illustrates an example architecture of a system 700 to provide content items and to enable hiding of one or more portions of content of a content item according to some implementations. In some examples, an instance of a content item 106 including content 702 with a hidden portion may be presented by one or more electronic devices 100 capable of displaying, rendering, playing or otherwise presenting the content item 106, such as on an associated display 102. Some examples of the electronic device(s) 100 may include digital media devices and eBook readers 100-1; tablet computing devices 100-2; desktop, terminal and workstation computing devices 100-3; smart phones and mobile devices 100-4; laptop and netbook computing devices 100-5; televisions, gaming systems and home electronic devices 100-6; and any other device capable of accessing and rendering or playing content items, online content, mobile content, textual content, multimedia content, or the like. For example, in the case that the content item includes a visual content portion such as in the case of an eBook, a video, or an image, the content may be presented on the display 102 of the electronic device 100. In other examples, such as when the content 702 with a hidden portion is purely audio, the presentation may be an audio presentation provided through speakers, headphones, (not shown in FIG. 7) or the like, of the electronic device 100.

In the illustrated example, the electronic device 100 is able to communicate with a content provider 704. For instance, the electronic device 100 may communicate with one or more computing devices 706 of the content provider 704, to access or receive at least one content item 106 over one or more networks 708. For example, the network(s) 708 may include a local area network (LAN), a wide area network (WAN), such as the Internet, or any combination thereof, and may include both wired and wireless communication technologies using any suitable protocols and communication techniques. The computing device 706 of the content provider and the electronic device 100 may communicate and interact with one another using any combination of suitable communication and networking protocols, such as Internet protocol (IP), transmission control protocol (TCP), hypertext transfer protocol (HTTP), and so forth. In some cases, the electronic device 100 may download one or more content items 106, while in other cases the content items 106 may be streamed to the electronic device 100.

The content provider 704 may maintain an online location or site 710, such as a merchant website, an e-commerce site, or other functionality that offers one or more content items 106 to the public. For example, the content provider site 710 may be hosted on one or more of the computing devices 706. In some cases, the host computing devices 706 may be one or more web servers located at a data center, server farm, or other single physical location. In other cases, the content provider site 710 or portions thereof may be located in diverse locations that are physically remote from one another. Further, in some implementations, the content provider site 710 may be a group of websites, data stores, services, and the like, hosted on a plurality of different host computing devices 706 in a plurality of diverse locations, or hosted by one or more host computing devices 706 at a single location.

In some implementations, the content provider site 710 may offer content items 106, such as books, magazines, newspapers, songs, movies, and so forth, to the public through an online presence accessible by a web browser or other application. In some examples, the content provider site 710 alternatively, or additionally, may provide content items 106 through an online or mobile application executing on the electronic device 100. For example, an application on the electronic device 100 may connect to or obtain content from the content provider site 710 to enable the purchase or management of one or more content items 106, and the like. Thus, the content provider site 710 may enable the electronic device 100 to access content items 106 through an online or mobile application executing on a mobile device as the electronic device 100, such as an eBook reader, smart phone, tablet computing device, or the like. Accordingly, the content provider site 710 is not limited to a website accessed by a browser, but may encompass other technologies for obtaining content items 106, such as through in-application shopping, and the like.

The electronic device 100 may include a provider interaction module 712, which in some instances may be an application, such as a web browser, mobile application, or other module or computer program configured to receive web content, webviews, online content, or the like, for accessing and interacting with one or more modules of the content provider 704. For example, the provider interaction module 712 may enable a user 714 to shop for content items at the content provider site 710 and access or receive content items 106 from the content provider site 710, such as by downloading through the network 708. Further, in some implementations, the provider interaction module 712 may enable the user 714 to organize or manage the content items 106 on the electronic device 100, while in other implementations, a separate management module (not shown) may provide this functionality.

The electronic device 100 may include a content item presentation module 716 and a content item library 718 that may include at least one content item 106. In some implementations, the presentation module 716 and the provider interaction module 712 may be separate modules or applications. In other implementations, the presentation module 716 and the provider interaction module 712 may both be part of the same application or computer program for accessing and presenting content on the electronic device 100. In yet other implementations, the presentation module 716 and the provider interaction module 712 may represent different functionalities of the same module.

As one example, the presentation module 716 may present content 702 of a content item 106 on the display 102. In some examples, the display 102 may be part of the electronic device 100, and/or unitary with the electronic device 100. In other examples, the display 102 may be separate from the electronic device 100 and connected to or coupled with the electronic device 100. In any case, the presentation module 716 may render content 702 of one or more of the content items 106 on the display 102 for viewing by the user 714. The presentation module 716 may further render, display or play content 702 having one or more hidden portions that are not displayed or played. For example, the content 702 of the content item 106 may be contained in at least one content file. Thus, the presentation module 716 may control which portions of the content 702 are presented as part of the content 702 when the content 702 in the content item 106 is accessed. Further, in some examples, the content item 106 may include metadata 720 that is associated with the particular instance of the content item 106, such as in one or more metadata files. In some examples, the metadata 720 may indicate one or more portions of the content 702 that are to be hidden, while in other examples, the file containing the content 702 may also include the information on hidden portions in the same file. Thus, the metadata 720 including a location of hidden content may be contained in a separate file, or in other examples, may be combined with the content 702 into a single file.

As mentioned above, the presentation module 716 may present interfaces for hiding and unhiding content and may display a suitable indicator at a location where a portion of content is hidden when presenting the content 702. In some examples, the interfaces 112, 408, and/or indicators 204, 504 of hidden content may be overlaid on the content 702 by the presentation module 716 at a designated location. For instance, in some cases, the interfaces 112, 408 and indicators

204, 504 may be generated using any of HTML (hypertext markup language), JavaScript®, CSS (Cascading Style Sheets), widgets, or any combination thereof, or any other suitable technology. For instance, as defined by the World Wide Web Consortium (W3C), a widget is an interactive single purpose application for displaying and/or updating local data or data from the Web, which may be packaged in a way to allow a single download and installation on a user's computing device, a mobile device, or the like. A widget may run as a stand-alone application, i.e., is able to run outside of a web browser, and the runtime environment in which a widget is run may be referred to as a widget user agent. A widget user agent may be specifically enabled for running widgets, or a more generic user agent (e.g., a web browser or other application) may run a widget. See, e.g., W3C.org, Working Group Note 27 Sep. 2011 for additional description of widgets. The W3C is an international community that develops open standards for use on the World Wide Web. Further, widgets, HTML, JavaScript®, and CSS are just several examples of technologies for displaying the interfaces and indicators described herein, and numerous other possible techniques, tools, functionalities, programming technologies, and the like will be apparent to those of skill in the art in light of the disclosure herein.

In some examples, the content 702 may be encrypted to prevent unauthorized access to hidden portions of the content 702. For example, the presentation module 716 may decrypt the content 702 when displaying or playing the content 702. Thus, encryption or other protective feature may inhibit, at least in part, access to hidden portions of the content item 106 such as in the case in which a user is not authorized to access the hidden portions, e.g., in the case of a student accessing answers in a textbook, a child accessing mature material, and so forth.

As another example, the hidden content may be secured by a password or other user credential. For instance, the presentation module 716 may request that the user to enter a password or provide another type of user credential, such as a biometric authentication, or the like, to unhide one or more portions of hidden content. Thus, the user may be presented with the option of entering a user credential when hiding the content of a particular content item, and the user credential may be required to unhide the hidden content when the content item is viewed on the user's device(s) and/or on devices of other users. As another alternative, the user may set a preference such that for all hidden content for a particular content item, or for all content items, a user credential is required to unhide the hidden content when the content item is viewed on the user's device(s) and/or on devices of other users. Numerous other variations for securing the hidden content will be apparent to those of skill in the art in light of the disclosure herein.

In some implementations, each content item 106 may include content 702, such as text, images, audio, video, or the like, and may further include the metadata 720 that is associated with the content item content 702. For example, the content provider 704, the author, the publisher, etc., may provide or may generate metadata 720 for a corresponding content item 106. As mentioned above, each instance of a content item 106 may be made up of any number of files or may be a single file. In some examples, the content provider 704 may generate the metadata 720 for a respective content item 106 to provide information related to the content 702 of the content item 106. For instance, the content provider 704 may include a content item preparation module 722 that may receive a raw content item from one or more sources of content items. The sources of content items may be publishers, authors, movie distributors, studios, music companies, artists, and so forth. In the case of textual content items, the content item preparation module 722 may parse and process the text of the raw content item to produce the content 702 that is compatible with various display formats, device platforms, and so forth. The content item preparation module 722 may further parse and analyze a raw content item to produce at least a portion of the metadata 720 that corresponds to the content item 106. For example, the metadata 720 may include a variety of information, such as a language in which the content is written and location information that identifies location of portions of content within the content item. In some examples, the metadata 720 may further identify the parts of speech contained in the content and the location of each part of speech contained in the content, each word, each character, or the like. For example, the content provider 704 may parse the content 702 into parts of speech, identify each part of speech, and associate a location in the content item with each part of speech. The metadata 720 may further identify the locations of individual sentences, paragraphs, chapters, and so forth in the content item. In some cases, the metadata location information may be used, at least in part, to enable identification of portions of the content 702 to be hidden. For example, the location of a word, sentence, chapter, and so forth, may be identified by referring to the metadata 720. Thus, during presentation of the content item, the presentation module may use the location information, at least in part, to determine which portions of the content item not to present.

The content provider site 710 may include a content item store module 724 that may provide or may access a content item catalog 726. For example, the content item store module 724 may present the content item catalog 726 to the provider interaction module 712 of an electronic device 100 that accesses the content provider site 710 to shop for a content item 106. The content item catalog 726 may include searchable and/or browsable listings and descriptions of content items 106 available from the content provider site 710. The content item store module 724 may communicate with the provider interaction module 712 on the electronic device 100 to enable the user 714 to locate and acquire a content item 106 from the content provider site 710.

The content provider site 710 may further include a delivery module 728 that may deliver a content item 106 to the electronic device 100 and/or the user 714. For example, in some instances, the delivery module 728 may facilitate the download of a content item to the electronic device 100 over the network(s) 708. In other instances, the delivery module 728 may provide for delivery of a hard copy of a content item 106 to the user 714, such as by delivery of a recording medium that maintains a copy of the content item, depending on the nature of the content item and the electronic device 100.

Furthermore, in some implementations, the delivery module 728 may refer to user information 730 to determine one or more content items 106 to download to the electronic device 100. For example, the user information 730 may include account information 732, such as user contact information, a purchase history, a user content item library, information on various devices 100 associated with a particular user account, or other records of content items purchased by the user 714, as well as other transactions with the user 714. Accordingly, in some cases, the delivery module 728 may assist in synchronizing the content of multiple devices 100 of a user or a user account, such as for delivering and synchronizing multiple instances of a content item 106 on multiple devices 100 associated with a single account.

Further, the user information 730 may include information for a plurality of users 714 of the content provider site 710. For example, the user information 730 may include account information 732 for each user for identifying and interacting with the user, such as name, email address, mailing address, telephone number, user identification (ID) number, user purchase history (e.g., content items 106 acquired by the user) and so forth.

In addition, in some examples herein, the user information may include hidden content information 734 regarding which portions of content have been hidden by which users on which content items 106. The hidden content information 734 may be collected and aggregated to determine which portions of content are popularly or most frequently hidden by a plurality of users. This information may then be provided to subsequent users, as discussed above with reference to FIG. 3. Further, the hidden content information 734 for a particular user account may be used to synchronize the hidden content with other instances of a particular content item on other devices 100 associated with the particular user's account.

The content provider site 710 may also include or may access a content item library 736. For example, the content item library 736 may include a plurality of content items 106 that the content provider 704 has available for access by electronic devices 100, such as by purchase through the content items catalog 726.

The content provider site 710 may also include various other site components as is known, depending on the design and intended use of the content provider site 710. For example, other site components may include one or more pages of content, such as webpages, webviews, or other online content, that may be presented to the user 714 through the provider interaction module 712, such as during shopping for content items from the content provider site 710.

The content provider site 710 may further include a hidden content management module 738 that may be employed in some implementations for managing the hidden content information 734. In some examples, when the user 714 of the electronic device 100 accesses, purchases or otherwise obtains a particular content item 106, such as through interaction with the content provider 704, the content provider 704 may make the particular content item 106, including the corresponding content 702 and metadata 720, available for delivery to the electronic device 100. Further, as discussed above, in some cases, a portion of content 702 of the content item 106 may be hidden by the content provider, the author, the publisher, or another entity other than the user. Accordingly, the content item 106 may be delivered to the user (or made available for delivery to the user) with some portion of content already hidden, such as discussed above with respect to FIG. 6. In some cases, the hidden content information 734 is included in the same file as the content 702, while in other cases, the hidden content information 734 may be maintained in metadata 720 corresponding to the particular instance of the content item 106. Further, in some implementations, the content item 106 may be provided to a third party, such as a wireless provider that sends the content item 106 to the electronic device 100. Accordingly, an intermediary, such as a wireless network provider (not shown), or the like, may make the content item 106 available to a particular electronic device 100, or may otherwise provide the content item to the particular electronic device 100, and may further provide for synchronization of metadata, such as hidden content information. For purposes of this disclosure, "providing" or "making available" by the content provider may include any intermediaries that perform delivery of the content items and/or information related to the content items, such as metadata.

In some examples, the user 714 may select and hide a portion of the content 702 after obtaining a particular instance of a content item 106. For example, the user 714 may decide to hide a particular portion of the content 702. In some cases, the hidden content information 740 includes selection information that is transmitted from the user's device 100 to the content provider site 710. The selection information included in the hidden content information 740 may indicate location of a portion of content to be hidden, or may otherwise identify a portion of content to be hidden. For instance, the hidden content management module 738 may add the hidden content information 740 obtained from the particular user to the user information 730, such as to the user's account information 732 and to the hidden content information 734. In some cases, the hidden content information 740 received from the user device 100 may then be synchronized by the hidden content management module 738 with other devices 100 of the particular user. For example, the hidden content management module 738 may make available for delivery at least hidden content information 742 that may be delivered to the user device(s) 100 so that when the user accesses the particular content item 106 on any user device 100, the portion of content is hidden. In some cases, the hidden content information 742 may be delivered as part of a metadata file 720, while in other cases, the hidden content information 742 may be delivered separately, or may be incorporated into a file including the content 702 and delivered as an updated content file or updated content item 106.

Additionally, the hidden content management module 738 may aggregate the hidden content information 734 collected from a plurality of users and a plurality of devices 100. The hidden content management module 738 may determine which portions of a particular content item are hidden frequently, and may inform users of this information, as discussed above with respect to FIG. 3. Numerous other variations will be apparent to those of skill in the art in light of the disclosure herein.

Figure 8:
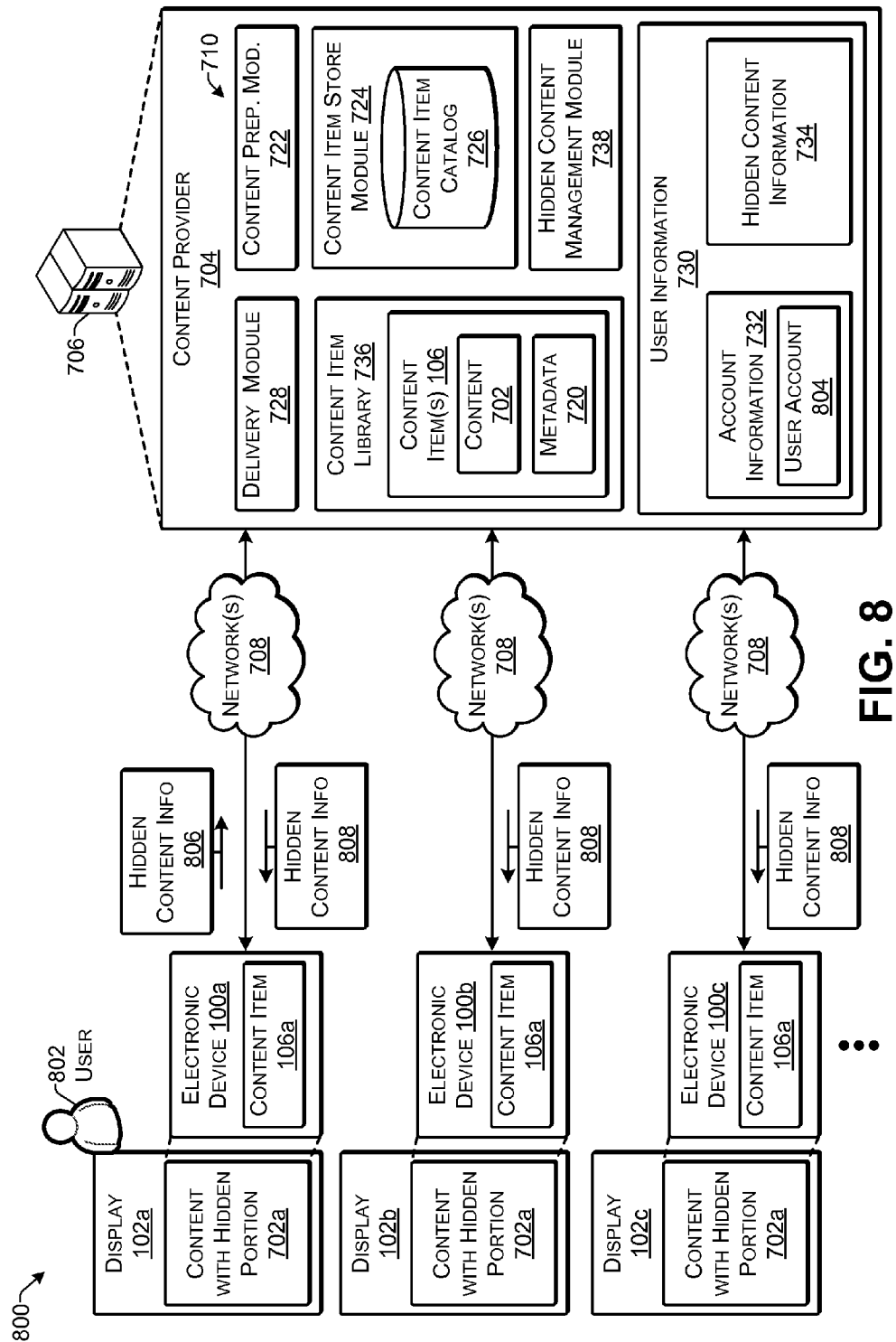
FIG. 8 illustrates an example system architecture for communicating hidden content information to multiple devices according to some implementations.

FIG. 8 illustrates an example architecture 800 to enable hiding a portion of content of a content item across multiple devices and multiple instances of the content item according to some implementations. In this example, suppose that a user 802 has multiple electronic devices 100a, 100b, 100c associated with a user account 804, and that each electronic device 100a, 100b, 100c includes an instance of a content item 106a that may be accessed on each of the user's devices 100. Furthermore, suppose that the user 802 hides a portion of content of the content item 106a while accessing the content item 106a on a first electronic device 100a and an associated first display 102a. Accordingly, electronic device 100a may present content 702a with a portion hidden on the first display 102a.

In addition, hidden content information 806 may be automatically synchronized with the user's other devices 100b, 100c, such as by the content provider 704 or by the user device 100a. For instance, the hidden content information 806 may be transmitted from the electronic device 100a to the content provider 704 as part of a periodic synchronization of any annotations, highlights, or other actions taken by the user 802 with respect to the content item 106a. As one example, the electronic device 100a may update the content provider 704 regarding a current location to which the user has advanced in the content item. For example, the user may have a plurality of electronic devices 100a, 100b, 100c, . . . , that are able to access the user's library of content items. Accordingly, each of these electronic devices may be associated with the user account 804 and a particular content item library (not shown in FIG. 8) that corresponds to the user account 804. Thus, the user may access the content item 106a on more than one electronic device 100, and the content item 106a may be synchronized across the user's devices 100, so that, for example, when the user opens the content item 106 on a different device 100, the user may be presented with a page or location at which the user previously stopped reading or otherwise consuming the content item 106a.

The content provider 704 may receive the hidden content information 806 regarding a particular portion of the content item 106a that was hidden by the user 802 while consuming the content item 106a on the electronic device 100a. For example, the hidden content information 806 may specify at least a start location and an end location in the content item 106a of the portion of hidden content. As mentioned above, in some instances, during preparation of a content item 106 for use on various electronic devices 100, each word, punctuation mark, image, and/or each alphanumeric character in a content item 106 may be assigned an identifiable location within the content item 106. Accordingly, in some examples, when a user selects a portion of content 702a to be hidden, a start location and an end location of the selected portion may be identified using the location information already associated with the content item 106a. Alternatively, as another example, the presentation module 716 may determine a page number, line number, and/or word number, of a start or end location of a portion of content selected to be hidden. As still another example, the presentation module 716 may identify a page and x-y coordinates on the page of a starting location and/or ending location of a portion of content selected to be hidden. Other variations will also be the apparent to those of skill in the art in light of the disclosure herein.

The content provider 704 may synchronize the content item 106a on the electronic device 100a with other instances of the content item 106a on the other electronic devices 100b, 100c associated with the user account 804. During the synchronization, the content provider computing device 706 may provide hidden content information 808 to electronic devices 100b and 100c. For example, the hidden content information 808 may include the hidden content information 806 obtained from the electronic device 100a. Furthermore, in some examples, the hidden content information 808 may include hidden content information 734 aggregated from a plurality devices 100 of other users, as discussed above, such as with respect to FIGS. 3 and 7. Accordingly, in some examples, as illustrated, the hidden content information 808 also may be synchronized back to the electronic device 100a, as well as to the electronic devices 100b and 100c.

The hidden content information 808 may be received by the electronic devices 100b and 100c, and may be employed the next time that the user accesses the content item 106a on one of the electronic devices 100b or 100c. For example, the hidden content information 808 may be included in the metadata 720 (not shown in FIG. 8) associated with the content item 106a on the electronic devices 100b, 100c. Alternatively, the hidden content information 808 may be incorporated directly into the content 702a of the content item 106a. Consequently, when the user 802 accesses the content item 106a on the electronic devices 100b or 100c, the content 702a with a portion hidden may be presented. Accordingly, one or more portions of content hidden by a user using any of the electronic devices 100a, 100b, 100c, associated with a particular user account, user login ID, or a particular content item library may be propagated automatically across the plurality of electronic devices 100a, 100b, 100c. Further, should the user decide to unhide a portion of content, or hide additional portions of content, this may also be propagated to the other user devices 100a, 100b, 100c, . . . , as described above.

Additionally, in some examples, the user 802 may have the option to specify whether content hidden on the electronic device 100a is also hidden on one or more of the electronic devices 100b or 100c. For example, the user 802 may specify that content hidden on the electronic device 100a is not hidden on the electronic devices 100b, 100c, etc., when the user 802 accesses the content item 106a on those devices. As another example, the user 802 may specify that content hidden on the electronic device 100a is not hidden on electronic device 100b, but is hidden on the electronic device 100c. The user may have the option to set preferences for each electronic device 100a, 100b, 100c, which may control whether hidden content information from other devices 100a, 100b, 100c is synchronized to a particular device 100a, 100b, 100c. Alternatively, the user 802 may be presented with the option of whether or not to incorporate the hidden content information when accessing each particular content item on one of the other devices 100b, 100c. Numerous other variations will be apparent to those of skill in the art having the benefit of the disclosure herein.

Furthermore, in the case that multiple users share a user account 804, a content item library 718, or the like, and thereby share access to the content item 106a, the content provider 704 may enable the users to set preferences as to whether portions of content hidden by a first user are also hidden to a second user associated with the user account or content item library. For example, a first user may be parent of a second user who is a child and a minor. Accordingly, content selected to be hidden by the first user may be hidden to the second user. Furthermore, in this example, the second user may not have the option to unhide the content portion(s) hidden by the first user. For example, the first user may have to log in to unhide the content. Thus, some implementations herein enable parental control of content by hiding content that a parent deems unsuitable for viewing by a child.

Figure 9:
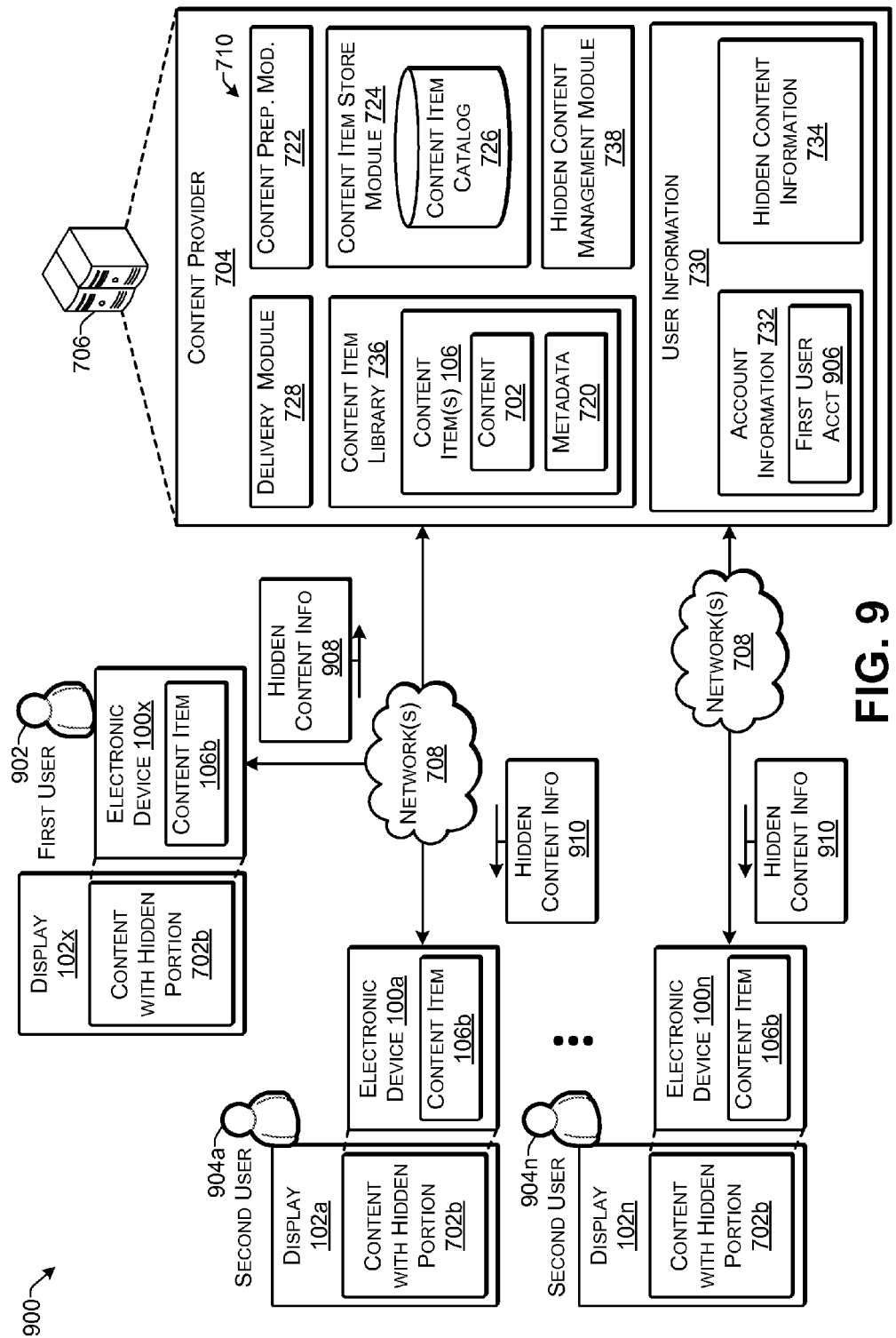
FIG. 9 illustrates an example architecture for remotely controlling hiding and/or unhiding content portions of a content item according to some implementations.

FIG. 9 illustrates an example architecture 900 to enable hiding a portion of content according to some implementations. In this example, a first user 902 has a position of control with respect to a content item 106b, and one or more second users 904a, . . . , 904n will access the content item 106b. As an example, the first user 902 may be a teacher, instructor, a parent, a presenter at a conference or training seminar, or the like, and the one or more second users 904 may be a student, a child, a conference or seminar attendee, respectively, or the like. The first user 902 may be associated with a first user account 906, which may give the first user 902 control over one or more hidden portions of the content item 106b. The first user 902 may access the content item 106b the on an electronic device 100x having an associated display 102x for displaying content 702b with one or more hidden portions. For instance, the first user 902 may select one or more portions of the content item 106b to hide from the second users.

Second users 904a, . . . , 904n may access the content item 106b on electronic devices 100a, . . . , 100n, having associated displays 102a, . . . , 102n. However, the instances of the content item 106b provided to the second users 904 may be configured to prevent unhiding of the portions of the content hidden by the first user 902. For example, the instances of content item 106b including associated metadata may prevent the presentation module 716 on the second user device from presenting the hidden portions of content. As one example, the presentation module 716 may simply not display an interface to enable unhiding of the hidden content. As another example, the hidden portions may be encrypted and presentation module 716 may require a key from the content provider or the first user for decrypting the hidden portion.

As one example, suppose that the first user is a teacher, the second users 904 are students, and the content item 106*b* is a digital textbook that includes an answers section for problems presented in the textbook. The first user 902 may hide the answers section and the content item 106*b* may be provided to the second users 904 with the answers section hidden. Subsequently, such as after the second users 904 complete a homework assignment, the first user may unhide a portion of the hidden content that provides answers to the completed homework assignment. For example, the first user 902 may provide hidden content information 908 to the content provider 704 and hidden content information 908 may be associated with the first user account 906 for enabling the first user to remotely control the hiding and the unhiding of content in the content item 106*b* maintained on the electronic devices 100*a*, . . . , 100*n* of the second users 904*a*, . . . , 904*n*.

Each second user 904 may have their own user account (not shown in FIG. 9) which may be associated with their own content item library. Thus, the content item 106*b* on each second user's electronic device 100 may be associated with that particular second user's content item library and user account. In this example, however, the content item 106*b* may be further associated with the first user account 906. For example, the first user account 906 may include a record or listing of each second user 904 that is a student in the first user's class and that has a copy of the content item 106*b* on their device 100. Accordingly, when the hidden content information 908 is received by the content provider, the content provider may synchronize hidden content information 910 to the content item 106*b* of each of the second users 904 linked to the first user account by the list. As a result, hidden content information 910 may be synchronized, provided, or otherwise made available to each electronic device 100 of each second user 904. Thus, receipt of the hidden content information 910 by the second user devices may unhide a specified portion of the hidden content thereby revealing one or more answers to the second users 904. For example, the hidden content information 910 to unhide content may specify a location in the content item of the portion of content to unhide. Furthermore, while the second users 904 may not be able to unhide (or in some examples, hide) particular portions of content of the content item 106*b* controlled by the first user 902 (e.g., the answers section), the second users may be able to hide and unhide various other portions of the content item 106*b* in the manner discussed above, such as with respect to FIGS. 1-6.

Additionally, the hidden content management module 738 may hide or unhide the hidden portion of content automatically upon the occurrence of an event. For example, when the hidden content management module 738 determines that a particular event has occurred, such as passage of a predetermined amount of time, the arrival of a specified date, or the like, the hidden content management module 738 may synchronize the hidden content information 910 to the content item 106*b* on the devices 100*a*, . . . , 100*n* of the second users 904. As one example, a children's book may include a plurality of stories. Initially, only one story may be accessed and the remainder of the stories may be hidden. The hidden content management module 738 may be configured to automatically uncollapse a new story once every week to provide an additional story for the child to read during that week.

Figure 10:
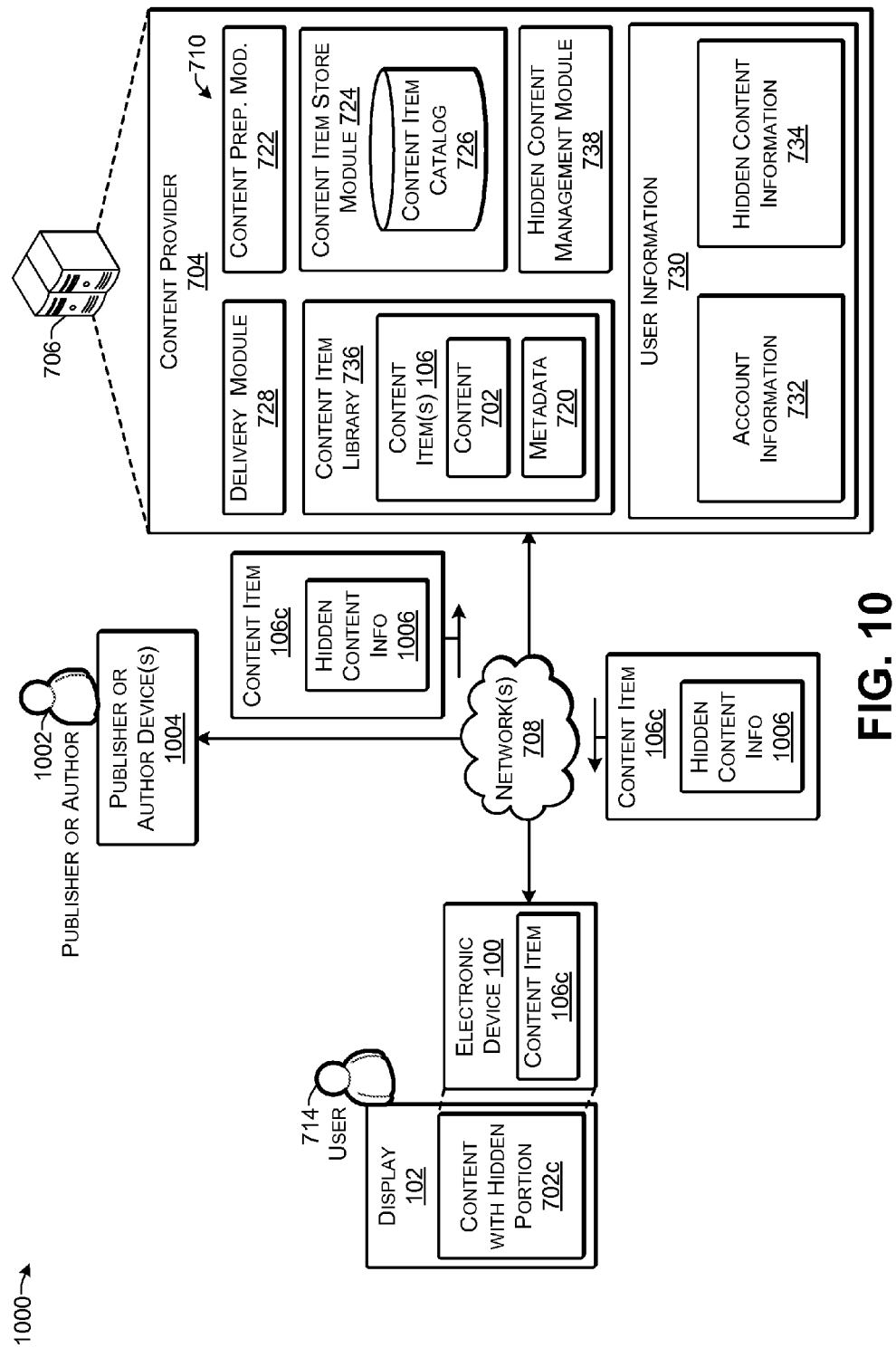
FIG. 10 illustrates an example architecture in which one or more of an author, a publisher, or the content provider identifies content to be hidden according to some implementations.

FIG. 10 illustrates an example architecture 1000 to enable hiding a portion of content according to some implementations. In this example, a publisher or author 1002 may provide, to the content provider 704, a content item 106*c* that includes specified portions of content that will be hidden during presentation of the content item 106*c*. For instance, several different file formats of content items may be employed by the content provider 704 to ensure compatibility with different types of electronic devices 100. Thus, in some examples, a content item file format refers to a type of file format in which the content of an electronic book is stored. Such content item file formats may be able to be read by some types of content presentation modules present of some types of electronic devices, but not by other types of content presentation modules present on other types of electronic devices. As one example, in the case of eBooks, some devices 100 may be able to access content items 106 that are formatted in a Mobi7 format (e.g., originally from Mobipocket SA, France), while other devices 100 may be able to access content items 106 that are formatted in Kindle format 8 (KF8 from Amazon). However, certain types of content that can be read by KF8 compatible devices cannot be read by Mobi7 compatible devices. For example, for certain types of tables, the Mobi7 reader is not able to render the tables properly, while KF8 readers are able to display the tables properly. Accordingly, to accommodate Mobi7 readers, tables may be provided by the publisher as JPEG images in addition to being provided as an HTML table for KF8 readers. Similarly, with respect to scalable vector graphics (SVG) content, the Mobi7 reader does not recognize SVG content, while the KF8 reader is able to properly render SVG content. Consequently, in addition to providing SVG content that can be rendered by the KF8 reader, the publisher may provide an equivalent JPEG image to be used by the Mobi7 reader. Thus, to provide a single content item file that is compatible with both types of devices, the publisher or author 1002 may create HTML files that can be converted into a Mobi7 format.

As one example, authors or publishers can create style sheets having various style information that causes a presentation module to hide content that is not intended to be presented by that presentation module. For instance, for parts of content that the publisher or author 1002 believes is not appropriate to be displayed on a particular type of device 100, the publisher or author 1002 may include a CSS (cascading style sheets) property "display" having a value "none," associated with the content so that the presentation module does not display the corresponding content. Implementations herein may use this CSS property to show or hide content for a particular presentation module. As one example, for content such as a JPEG image that replaces a table or SVG content, the file may include associated code such as "media amzn-mobi {kf8content {display: none; }}." Similarly, with respect to a table or SVG content that a Mobi7 presentation module cannot properly render, associated code may be "@media amzn-kf8 {mobi7content {display: none; }}." Accordingly, the Mobi7 presentation module will hide the table or SVG content, while the KF8 presentation module will hide the JPEG images provided to accommodate the Mobi7 presentation module.

As illustrated in FIG. 10, a publisher or author 1002 may provide, to the content provider 704, a content item 106*c* including hidden content information 1006 that may result in hiding a portion of content of the content item 106*c* when the content item 106*c* is presented. Alternatively, of course, the content provider 704 may modify the content item 106*c* to prevent Mobi7 content from being displayed by the KF8 reader and to prevent KF8 content from being displayed by a Mobi reader. Accordingly, the content item 106*c*, including the hidden content information 1006 embedded therein, may be delivered to an electronic device 100 of a user and displayed with a portion hidden, as described above.

Figure 11:
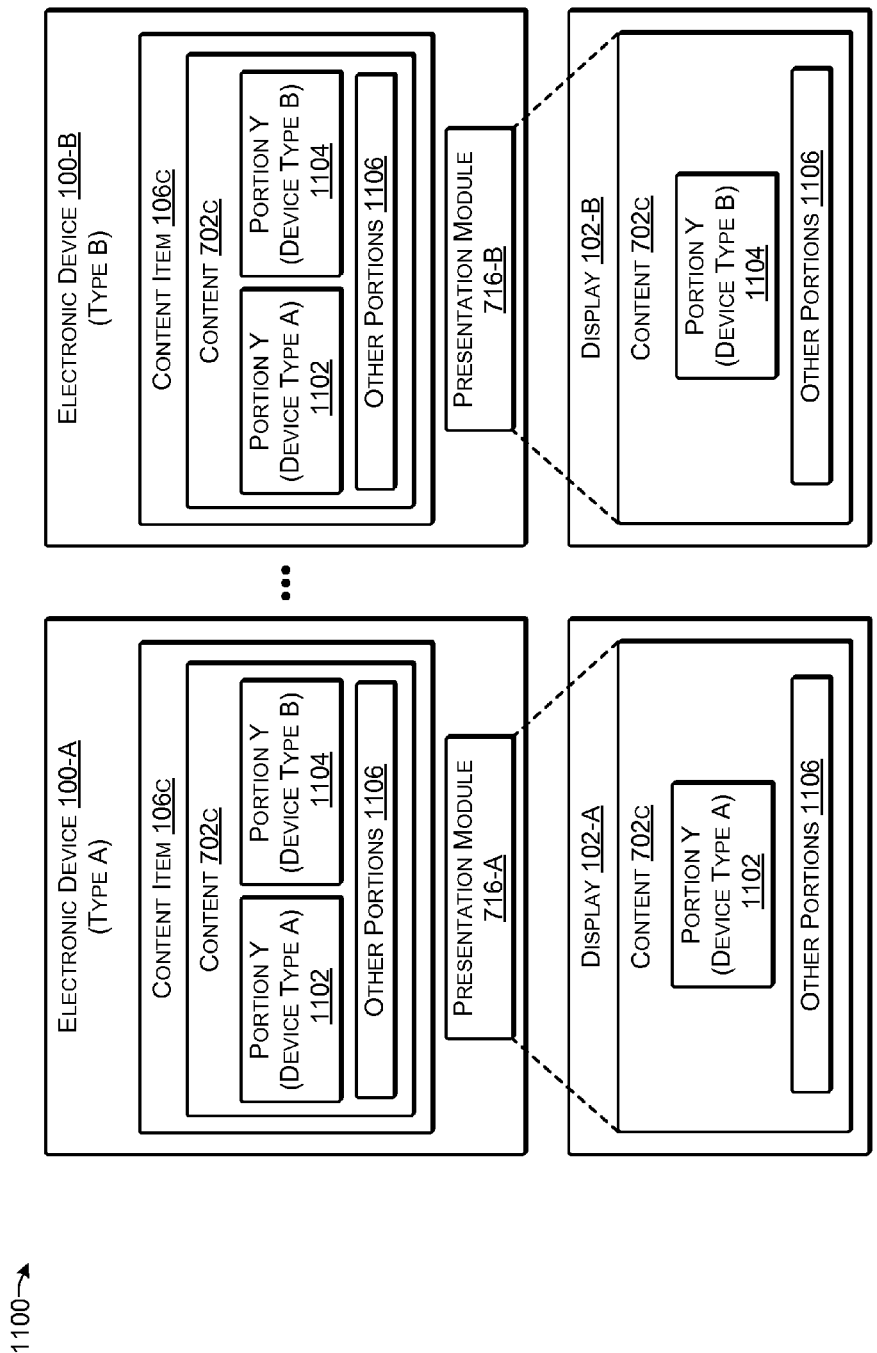
FIG. 11 illustrates example framework including electronic devices of different types hiding different portions of content according to some implementations.

FIG. 11 illustrates a framework 1100 to hide different types of content using different types of devices according to some implementations. In this example, a first electronic device 100-A and a second electronic device 100-B are two different types of devices. For example, the electronic device 100-A may be a type A device able to read a first type of content item format, while electronic device 100-B may be a type B device able to read a second type of content item format. The presentation modules 716-A, 716-B on each device 100 may display the content item 106c on an associated display 102-A, 102-B, respectively. In this example, such as in the case described above with respect to FIG. 10, content item 106c may include content 702c that includes a portion Y 1102 that is compatible with device type A and another portion Y 1104, containing the same content, that is compatible with device type B. For example, portion Y may be a table, SVG content, or any other type of content that is not compatible with one or more presentation modules 716 on one or more devices 100. Furthermore, the content 702c may include other portions 1106 of content that are compatible with both types of devices A and B.

Consequently, when presentation module 716-A displays the content 702c, the presentation module 716-A will display only the portion Y 1102 that is compatible with device type A and the other portions 1106, while hiding the portion Y 1104 that is compatible with device type B. Similarly, the presentation module 716-B will display only the portion Y 1004 that is compatible with device type B and the other portions 1106, while hiding the portion Y 1102 that is compatible with the device type A. Other variations will also be apparent to those of skill in the art in light of the disclosure herein.

Example Electronic Device

Figure 12:
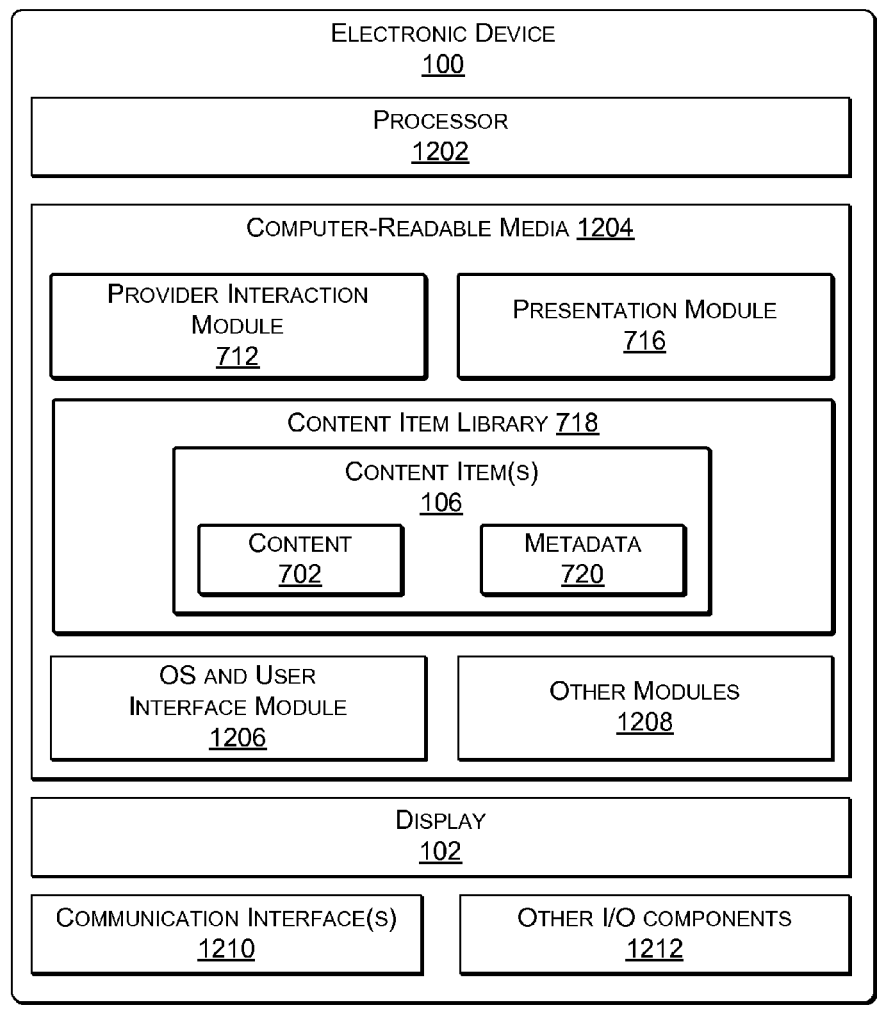
FIG. 12 illustrates select components of an example electronic device according to some implementations.

FIG. 12 illustrates select example components of the electronic device 100 that may be used to implement the functionality described above according to some implementations. In a very basic configuration, the electronic device 100 includes, or accesses, components such as at least one processor 1202 and one or more computer-readable media 1204. Each processor 1202 may itself comprise one or more processors or cores. Depending on the configuration of the electronic device 100, the computer-readable media 1204 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 1202 directly or through another computing device. Accordingly, the computer-readable media 1204 may be computer-readable media able to maintain instructions, modules or components executable by the processor 1202.

The computer-readable media 1204 may be used to store any number of functional components that are executable by the processor 1202. In some implementations, these functional components comprise instructions or programs that are executable by the processor 1202 and that, when executed, implement operational logic for performing the actions attributed above to the electronic device 100. Functional components of the electronic device 100 stored in the computer-readable media 1204 may include the presentation module 716, as described above, which may be executed by the processor 1202 for presenting one or more content item 106 contained in the content item library 718. Additional functional components stored in the computer-readable media 1204 may include the provider interaction module 712, executable by the processor 1202 for obtaining the content item(s) 106, as well as any corresponding hidden content information provided by the content provider site 710. Other functional components may include an operating system and user interface module 1206 for controlling and managing various functions of the electronic device 100. Depending on the type of the electronic device 100, the computer-readable media 1204 may also optionally include other functional components, such as other modules 1208, which may include applications, programs, drivers and so forth.

The computer-readable media 1204 may also store data, data structures, and the like that are used by the functional components. For example, data stored by the computer-readable media 1204 may include the content item library 718, containing one or more content items 106. Each content item 106 may include content 702 and metadata 720, which may be contained in a single file or in multiple files. The electronic device 100 may also include other data, which may include, for example, data used by the provider interaction module 712, the operating system and user interface module 1206, and the other modules 1208. Further, the electronic device 100 may include many other logical, programmatic and physical components, of which those described are merely examples that are related to the discussion herein.

FIG. 12 further illustrates the display 102, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 102 may be an active display such as a liquid crystal display, plasma display, light emitting diode display, organic light emitting diode display, and so forth. These displays may comprise drive electronics, such as a display drive matrix configured to affect individual pixels within the display 102. Additionally, in some implementations, the display 102 may be a 3D display capable of providing a 3D image. For example, the display 102 may produce a 3D image by providing alternating left-eye and right-eye images with or without the use of shuttering or filtering eyeglasses. Accordingly, in some implementations, the content items and user interface components herein may be rendered in 3D.

One or more communication interfaces 1210 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 1210 may allow a user of the electronic device 100 to access the World Wide Web, download content items from the content provider site 710, access online content, such as from a website or other network location, and the like. The communication interface 1210 may further allow a user to access storage on another device, such as a user's computing device, a network attached storage device, or the like.

The electronic device 100 may further be equipped with various other input/output (I/O) components 1212. Such I/O components may include a touchscreen and various user controls (e.g., buttons, a joystick, a keyboard, a mouse, etc.), speakers, a microphone, a camera, connection ports, and so forth. For example, the operating system 1206 of the electronic device 100 may include suitable drivers configured to accept input from a keypad, keyboard, or other user controls and devices included as the I/O components 1212. For instance, the user controls may include page turning buttons, navigational keys, a power on/off button, selection keys, and so on. Additionally, the electronic device 100 may include various other components that are not shown, examples of which include removable storage, a power source, such as a battery and power control unit, a global positioning system (GPS) device, a PC Card component, and so forth. Further, in some examples, the author or publisher computing device(s) 1004 may be, or may have a configuration and components similar to the electronic device 100.

Example Computing Device(s)

Figure 13:
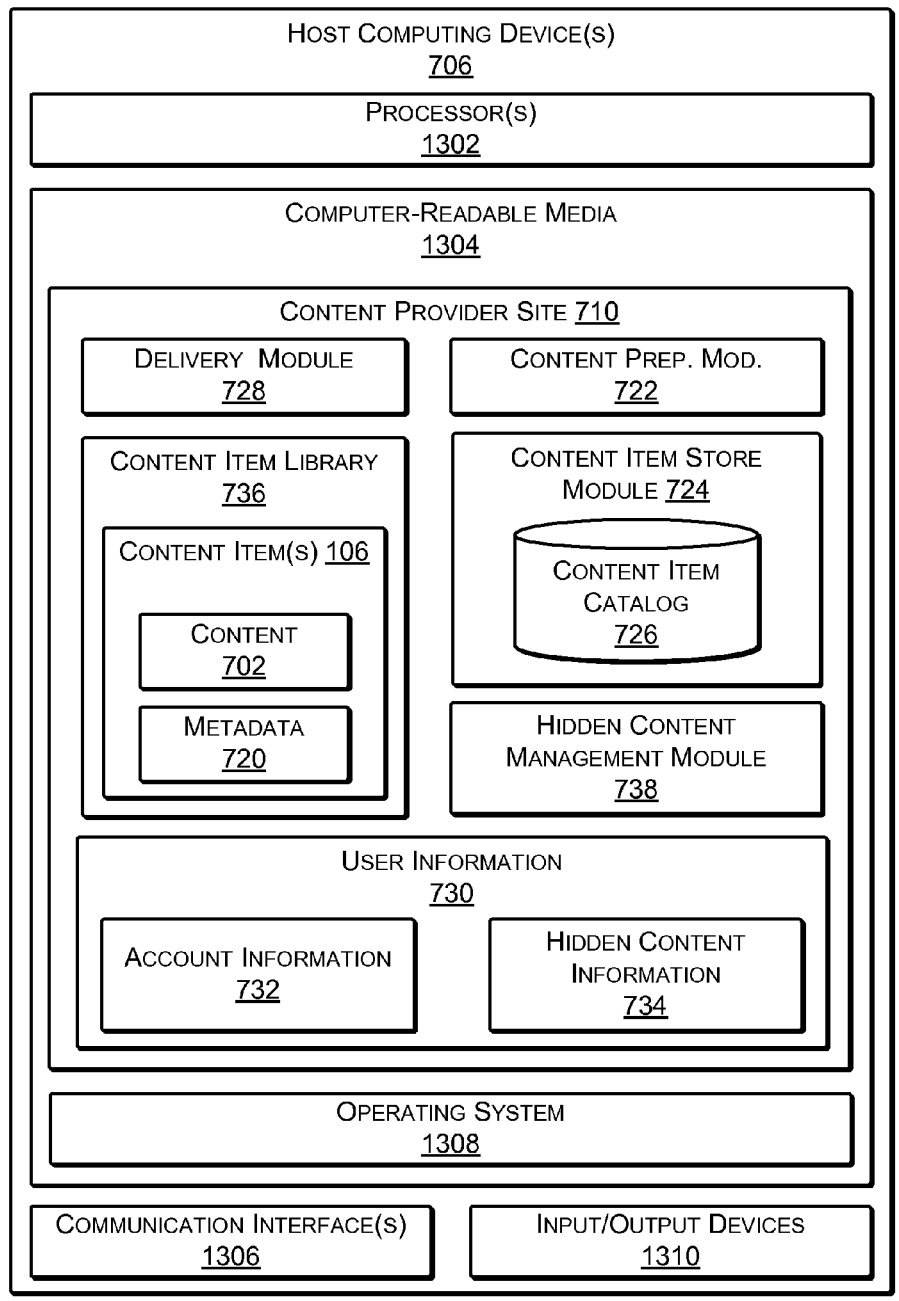
FIG. 13 illustrates select components of one or more example host computing devices of a content provider according to some implementations.

FIG. 13 illustrates select components of one or more host computing devices 706 that may be used to implement the functionality of the content provider site 710 according to some implementations. The content provider site 710 may be hosted on one or more servers or other types of computing devices that may be embodied in any number of ways. For instance, in the case of a server, the content provider site 710 may be implemented on a single server, a cluster of servers, a server farm or data center, a cloud hosted computing service, and so forth, although other computer architectures (e.g., a mainframe architecture) may also be used. Further, while the figures illustrate the components of the content provider site 710 as being present in a single location, it is to be appreciated that these components may be distributed across different computing devices and locations in any manner. Generally, the content provider site 710 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 13, an example host computing device 706 includes one or more processors 1302, one or more computer-readable media 1304, and one or more communication interfaces 1306. The processor(s) 1302 may be a single processing unit or a number of processing units, and may include single or multiple computing units or multiple cores. The processor(s) 1302 can be configured to fetch and execute computer-readable instructions stored in the computer-readable media 1304 or other computer-readable media.

The computer-readable media 1304 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 706, the computer-readable media 1304 may be a type of computer-readable storage media and may be a non-transitory storage media.

The computer-readable media 1304 may be used to store any number of functional components that are executable by the processors 1302. In many implementations, these functional components comprise instructions or programs that are executable by the processors 1302 and that, when executed, implement operational logic for performing the actions attributed above to the content provider site 710 and content provider 704. Functional components of the content provider site 710 that may be executed on the processors 1302 for implementing the various functions and features related to providing content items and hidden content as described herein, include the content preparation module 722, the content item store module 724, the delivery module 728, and the hidden content management module 738. Additional functional components stored in the computer-readable media 1304 may include an operating system 1308 for controlling and managing various functions of the host computing device(s) 706.

In addition, the computer-readable media 1304 may include, or the host computing device(s) 706 may access, data that may include the content item library 736, including one or more content items 106. The data may further include the user information 730, including account information 732 and hidden content information 734. In addition, the computer-readable media 1304 may store or the host computing devices(s) 706 may access the content item catalog 726 used by the content item store module 724. The host computing device(s) 706 may also include many other logical, programmatic and physical components, of which those described above are merely examples that are related to the discussion herein.

The communication interface(s) 1306 may include one or more interfaces and hardware components for enabling communication with various other devices, such as the electronic devices 100, over the network(s) 708. For example, communication interface(s) 1306 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 708 may include any suitable network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 706 may further be equipped with various input/output devices 1310. Such I/O devices 1310 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

FIGS. 14-17 illustrate example processes for hiding a portion of content in connection with a content item according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

Figure 14:
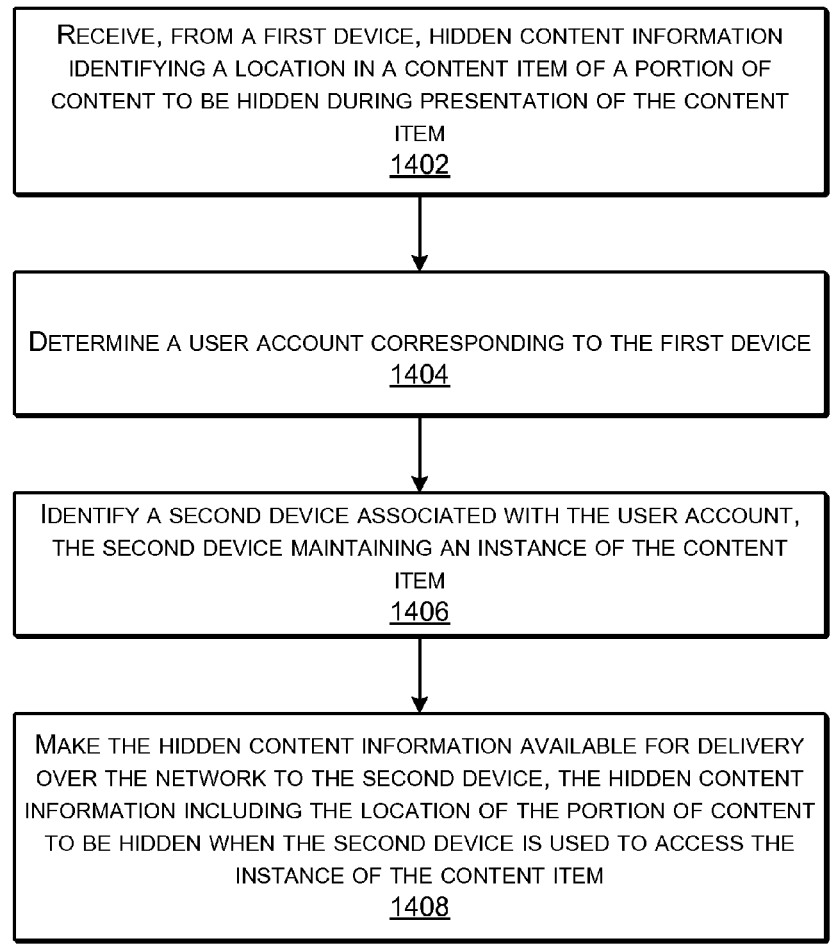
FIG. 14 is a flow diagram illustrating an example process that may be executed by a content provider computing device in connection with hiding content of a content item according to some implementations.

FIG. 14 is a flow diagram illustrating an example process 1400 that may be executed by a content provider computing device in connection with hiding content of a content item according to some implementations.

At 1402, a computing device receives, from a first device, hidden content information identifying a location in a content item of a portion of content to be hidden during presentation of the content. For example, the content provider may receive hidden content information from a first electronic device of a user when the user has hidden a portion of content of a content item on the first electronic device.

At 1404, the computing device determines a user account corresponding to the first device. For example, the computing device may refer to account information to identify a user account corresponding to the first device.

At 1406, the computing device identifies a second device associated with the user account. For example, the computing device may identify a second device associated with the user account that maintains or accesses an instance of the content item.

At 1408, the computing device makes the hidden content information available for delivery over the network to the second device. For example, the hidden content information may include at least location information indicating the location of the portion of content to be hidden when the second device is used to access the instance of the content item.

Figure 15:
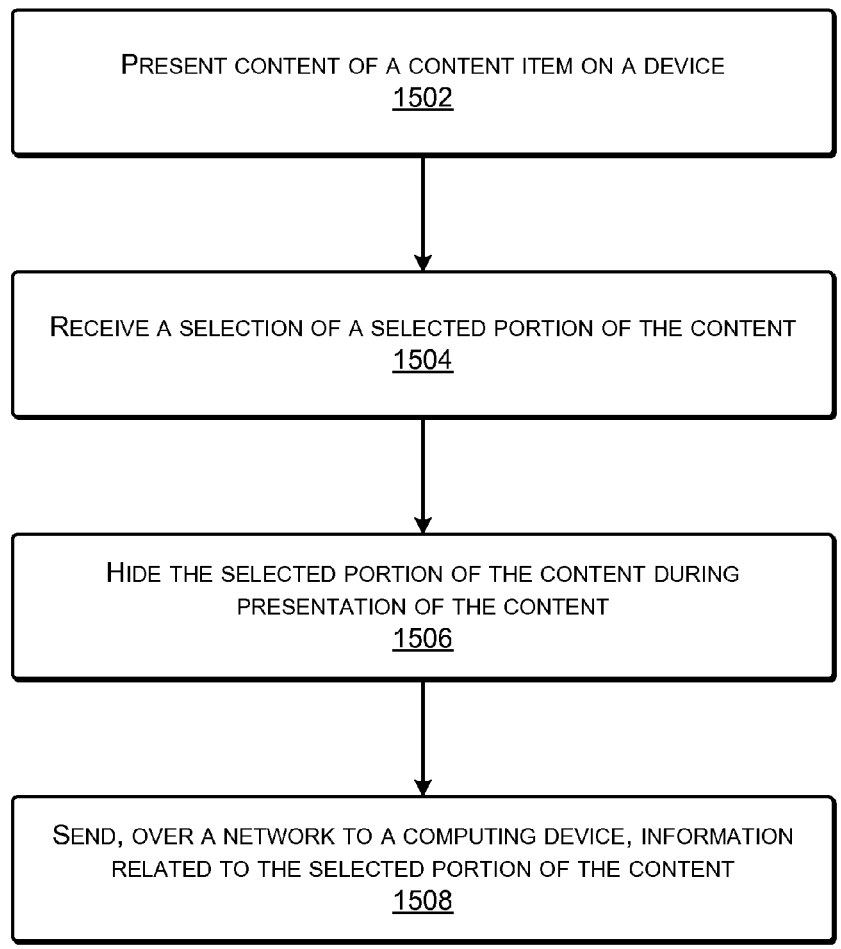
FIG. 15 is a flow diagram illustrating an example process that may be executed by a device for hiding content of a content item according to some implementations.

FIG. 15 is a flow diagram illustrating an example process 1500 that may be executed by an electronic device for hiding a portion of content of a content item according to some implementations herein.

At 1502, the electronic device presents content of a content item on the electronic device. For example, the electronic device may display the content of a content item on a display of the device, and/or may play the content item through speakers of the device, or the like.

At 1504, the electronic device receives a selection of a portion content of the content item. For example, the user may select the portion of the content item by directly selecting the portion or by selecting an identifier of the portion such as in a table of contents.

At 1506, the electronic device hides the selected portion of the content during presentation of the content. For example, when the device presents the content on the display, the device may skip over or otherwise not present the portion of the content selected to be hidden.

At 1508, the electronic device sends information related to the hidden content to a computing device, regardless of whether the content item is sent to the computing device. For example, the electronic device may send, over a network, hidden content information that includes at least selection information that is indicative of a portion of the content to be hidden from presentation. For instance, the selection information does not necessarily include the content that is to be hidden, but instead may merely indicate a location of the portion of content, or may otherwise identity the portion of content to be hidden. The electronic device may send the hidden content information to the computing device of a content provider, which may synchronize the hidden content into other instances of the content item on other user devices. The hidden content information may include at least location information indicating a location within the content item of the hidden content. Further, the hidden content information may be sent to the computing device without sending the content item or content of the content item. For example, the electronic device may synchronize with the content provider computing device to provide hidden content information to the computing device and/or receive hidden content information from the computing device.

Figure 16:
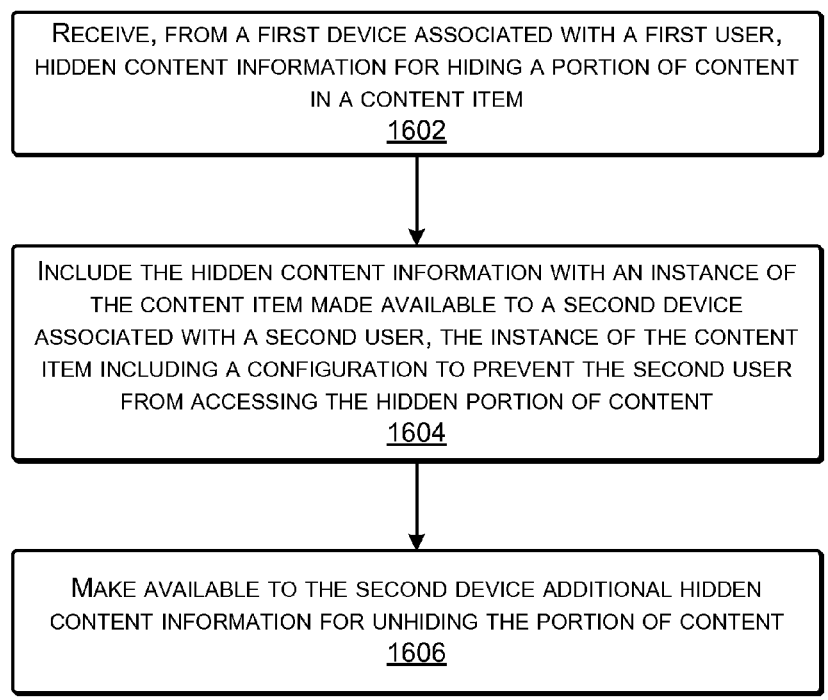
FIG. 16 is a flow diagram illustrating an example process that may be executed by a content provider computing device in connection with hiding content of a content item according to some implementations.

FIG. 16 is a flow diagram illustrating an example process 1600 that may be executed by the computing device of a content provider in connection with hiding content of a content item according to some implementations herein.

At 1602, the computing device receives from a first device associated with a first user, hidden content information for hiding a portion of content in a content item.

At 1604, the computing device includes the hidden content information with an instance of the content item made available to a second device associated with a second user. For example, the instance of the content item may include a configuration to prevent the second user from accessing the hidden portion of content. As one example, the instance of the content item may include a configuration that prevents a presentation module from displaying controls to unhide the hidden portion of content. As another example, the hidden portion of content may be encrypted or otherwise unable to be presented by the presentation module without receiving a key from the content provider or the first user.

At 1606, additional hidden content information may be made available to the second device for unhiding the hidden portion of content on the second device. For example, the additional hidden content may be made available by the first user, or by the content provider, such as in response to the occurrence of an event.

Figure 17:
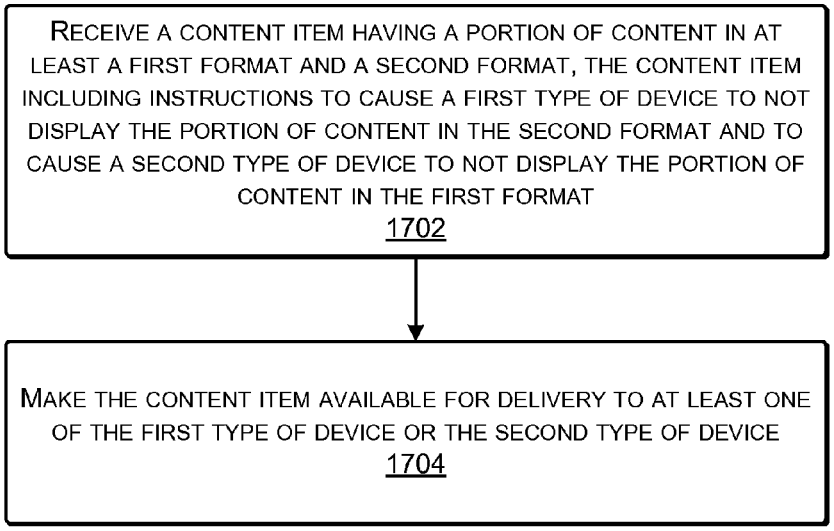
FIG. 17 is a flow diagram illustrating an example process that may be executed by a content provider computing device in connection with hiding content of a content item according to some implementations.

FIG. 17 is a flow diagram illustrating an example process 1700 that may be executed by a content provider computing device in connection with hiding a portion of content of a content item according to some implementations herein.

At 1702, the computing device receives, from a computing device, a content item having a portion of content in at least a first format and a second format. For example, the content item may include a portion of content in a first version compatible with a first content item file format and in a second version compatible with a second content item file format. In some examples, the first version and the second version of the portion of content are encoded to cause a first device, that is able to display the first content item file format, but not the second content item file format, to not display the second version of the portion of content when displaying content of the content item. Furthermore, the first version and the second version of the portion of content may be encoded to cause a second device, that is able to display both the first content item file format and the second content item file format, to not display the first version of the portion of content when displaying the content of the content item. As one example, as discussed above, the first type of device may be able to present Mobi7 type content while the second type of device may be configured to present KF8 type content.

At 1704, the computing device makes the content item available for delivery to at least one of the first device or the second type of device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. One or more non-transitory computer-readable media maintaining instructions executable by one or more processors to perform operations comprising:
   receiving, over a network, from a first device, hidden content information including location information identifying at least a location, in a content item, of a portion of content to be hidden during presentation of the content item;
   determining a user account associated with the first device;
   determining a second device associated with the user account, the second device maintaining an instance of the content item; and
   sending the hidden content information to the second device based at least in part on determining that the second device is associated with the user account, the hidden content information including at least the location information identifying the portion of content to be hidden when the second device is used to access the instance of the content item.

2. The one or more computer-readable media as recited in claim 1, wherein the hidden content information is included in metadata made available for delivery to the second device, the metadata associated with the instance of the content item.

3. The one or more computer-readable media as recited in claim 1, the operations further comprising aggregating the hidden content information received from the first device with additional hidden content information, related to the content item, received from one or more other devices associated with one or more other user accounts to determine one or more portions of the content item that have been hidden by a plurality of users.

4. The one or more computer-readable media as recited in claim 3, the operations further comprising making aggregated hidden content information available for delivery to at least one of the first device or the second device.

5. The one or more computer-readable media as recited in claim 1, wherein the hidden content information further includes additional location information indicating a location of a portion of content to be unhidden when the second device is used to access the instance of the content item.

6. A method comprising:
   under control of one or more processors configured with executable instructions,
   presenting content of a content item on a device;
   receiving selection information indicative of a portion of the content to be hidden from presentation;
   sending the selection information over a network to a computing device, wherein the selection information does not include the content to be hidden from presentation; and
   hiding the portion of content from presentation during presentation of the content of the content item.

7. The method as recited in claim 6, wherein receiving the selection information indicative of the portion of the content further comprises receiving selection information indicative of a portion of text of the content item.

8. The method as recited in claim 6, wherein:
   receiving the selection information indicative of the portion of the content further comprises receiving a selection of a chapter identifier in a table of contents of the content item; and
   the portion of content is a chapter of the content item corresponding to the chapter identifier.

9. The method as recited in claim 6, wherein the portion of the content includes an image.

10. The method as recited in claim 6, further comprising, prior to receiving the selection information indicative of the portion of the content to be hidden from presentation, displaying an interface overlaid on presentation of the content item, the interface including a control that is selectable to hide the portion of the content.

11. The method as recited in claim 6, further comprising, during presentation of the content of the content item, displaying an indicator of hidden content at a location in the content in place of the portion of content to be hidden.

12. The method as recited in claim 11, further comprising displaying with the indicator, or as the indicator, a control that is selectable to unhide the portion of content.

13. The method as recited in claim 6, wherein sending the selection information includes sending at least location information, the location information identifying a location in the content of the portion of the content to be hidden.

14. The method as recited in claim 6, wherein the content item includes at least one of:
   text content;
   video content;
   audio content; or
   image content.

15. A device comprising:
a display;
one or more processors;
one or more computer-readable media; and
one or more modules maintained on the one or more computer-readable media and executed by the one or more processors to perform acts comprising:
  displaying, on the display, one or more identifiers of one or more respective portions of content of a content item, wherein the one or more identifiers comprise at least one of a chapter identifier or an image identifier;
  receiving a selection of at least one of the identifiers for hiding at least one portion of content corresponding to each selected identifier; and
  when displaying content of the content item, not displaying the at least one portion of content corresponding to the at least one selected identifier.

16. The device as recited in claim 15, wherein the one or more identifiers are chapter identifiers displayed in a table of contents of the content item and the respective portions of content are chapters of the content item corresponding to the chapter identifiers.

17. The device as recited in claim 15, wherein the one or more identifiers are one or more image identifiers and the respective portions of content are images included in the content corresponding to the image identifiers.

18. The device as recited in claim 15, wherein the at least one selected identifier is not hidden during display of the content of the content item.

19. The device as recited in claim 15, further comprising displaying an indicator in association with the at least one selected identifier indicating the corresponding content is hidden.

20. A system comprising:
one or more processors;
one or more computer-readable media; and
one or more modules maintained on the one or more computer-readable media to be executed by the one or more processors to perform operations including:
  receiving, from a first device associated with a first user, hidden content information for hiding a portion of content in a content item; and
  including the hidden content information with an instance of the content item made available to a second device associated with a second user, the instance of the content item configured to cause a presentation module on the second device to prevent the second user from accessing the hidden portion of content.

21. The system as recited in claim 20, wherein the hidden content information includes at least location information indicating a location in the content item of the portion of content to be hidden when the second user accesses the content item.

22. The system as recited in claim 20, the operations further comprising:
  receiving from the first device additional hidden content information for unhiding the portion of content, the additional hidden content information including at least location information indicating a location in the content item of the portion of content to unhide; and
  making available to the second device the additional hidden content information for unhiding the portion of content.

23. The system as recited in claim 20, further comprising:
  determining that an event has occurred; and
  making available to the second device additional hidden content information for unhiding the portion of content, the additional hidden content information including at least location information indicating a location in the content item of the portion of content to unhide.

24. The system as recited in claim 23, wherein the event comprises at least one of:
  receiving an indication that the second device is located inside or outside of a geographic region;
  arrival of a predetermined date; or
  passage of a predetermined period of time from an identified point in time.

25. The system as recited in claim 23, wherein the instance of the content item is configured to cause the presentation module on the second device to prevent the second user from accessing the hidden portion of content by causing the presentation module to not display controls to unhide the hidden content.

26. The system as recited in claim 23, wherein the instance of the content item is configured to cause the presentation module on the second device to prevent the second user from accessing the hidden portion of the content by causing the presentation module to require a user credential to unhide the hidden content.

27. A system comprising:
one or more processors;
one or more computer-readable media; and
one or more modules maintained on the one or more computer-readable media to be executed by the one or more processors to perform operations including:
  receiving, from a computing device, a content item having a portion of content in a first version compatible with a first content item file format and in a second version compatible with a second content item file format, wherein:
    the first version and the second version of the portion of content are encoded to cause a first device, able to display the first content item file format, but not the second content item file format, to not display the second version of the portion of content when displaying content of the content item; and
    the first version and the second version of the portion of content are encoded to cause a second device, able to display both the first content item file format and the second content item file format, to not display the first version of the portion of content when displaying the content of the content item; and
  making the content item available for delivery to at least one of the first device or the second device.

28. The system as recited in claim 27, wherein the computing device is a computing device of at least one of:
an author; or
a publisher.

29. The system as recited in claim 27, wherein:
the first device includes a first presentation module able to present the first content item file format and not able to present the second content item file format; and
the second device includes a second presentation module able to present both the first content item file format and the second content item file format.

30. A device comprising:
a display;
one or more processors;
one or more computer-readable media; and
one or more modules maintained on the one or more computer-readable media and executed by the one or more processors to perform acts comprising:
  displaying, on the display, content of an electronic book;
  receiving a user selection of a selected portion of the content of the electronic book;

displaying, concurrently with the content, a control selectable to hide at least one of:
- the selected portion of content; or
- a section of the electronic book including the selected portion of content;

receiving, via the control, a user input to hide at least one of the selected portion of the content or the section of the electronic book; and when displaying the content of the electronic book on the display, hiding the at least one of the selected portion of content or the section of the electronic book based at least in part on the user input.

31. The device as recited in claim 30, the acts further comprising, when displaying the content of the content item, displaying an indicator of hidden content at a location in the content in place of the selected content.

32. The device as recited in claim 31, the acts further comprising displaying with the indicator, or as the indicator, a control that is selectable to unhide the selected content.

33. The device as recited in claim 30, wherein:
- the receiving the selection of the selected portion of the content includes receiving a selection of one or more chapter identifiers displayed in a table of contents of the electronic book; and
- the selected portion of content is a respective one or more chapters of the electronic book.

\* \* \* \* \*